United States Patent [19]

Davis et al.

[11] Patent Number: 5,937,160
[45] Date of Patent: Aug. 10, 1999

[54] SYSTEMS, METHODS AND COMPUTER PROGRAM PRODUCTS FOR UPDATING HYPERTEXT DOCUMENTS VIA ELECTRONIC MAIL

[75] Inventors: Jason O'Neal Davis, Four Oaks; Brian Keith Gold, Garner, both of N.C.

[73] Assignee: Reedy Creek Technologies, Inc., Four Oaks, N.C.

[21] Appl. No.: 08/846,852

[22] Filed: May 1, 1997

[51] Int. Cl.⁶ .................................................. G06F 17/30
[52] U.S. Cl. ...................................... 395/200.33; 707/10
[58] Field of Search ...................... 707/1–10, 100–104, 707/200–206, 501, 513; 395/200.33, 200.48, 200.49, 200.57; 345/327

[56] References Cited

U.S. PATENT DOCUMENTS

| | | |
|---|---|---|
| 5,530,852 | 6/1996 | Meske, Jr. et al. . |
| 5,572,643 | 11/1996 | Judson ................................. 395/200.48 |
| 5,793,966 | 8/1998 | Amstein et al. ..................... 395/200.33 |
| 5,835,087 | 11/1998 | Herz et al. ............................... 345/327 |
| 5,835,712 | 11/1998 | Dufresne ............................. 395/200.33 |

OTHER PUBLICATIONS

Cedro Group Business Tools; http://www.cedro.com/tools.html#publish.

Primary Examiner—Ruay Alan Ho
Attorney, Agent, or Firm—Myers Bigel Sibley & Sajovec, P.A.

[57] ABSTRACT

Systems, methods, and computer program products are provided for automatically revising a hypertext document stored within a server connected to a computer network via an e-mail message. An e-mail message containing revisions to a hypertext document is generated and includes identification of a markup tag contained within the hypertext document. The e-mail message is transmitted to the server hosting the hypertext document via the computer network. After the e-mail message is authenticated, an identified markup tag within the hypertext document is replaced with revisions contained within the e-mail message. The revised hypertext document is then stored in a directory on the server.

45 Claims, 28 Drawing Sheets

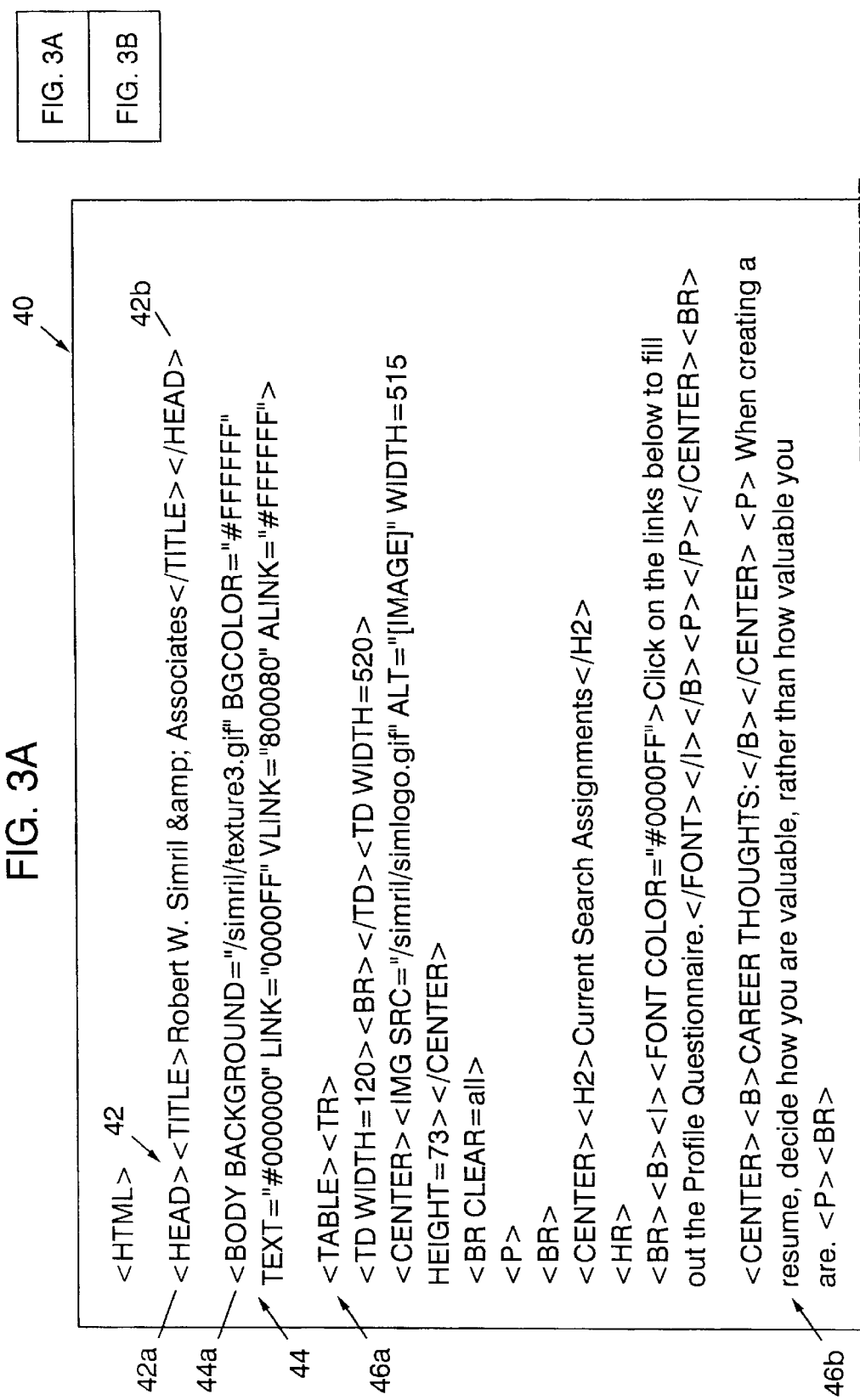

```
<HTML>                                                                           42
<HEAD><TITLE>Robert W. Simril & Associates</TITLE></HEAD>                    42b
<BODY BACKGROUND="/simril/texture3.gif" BGCOLOR="#FFFFFF"
TEXT="#000000" LINK="0000FF" VLINK="800080" ALINK="#FFFFFF">
<TABLE><TR>
<TD WIDTH=120><BR></TD><TD WIDTH=520>
<CENTER><IMG SRC="/simril/simlogo.gif" ALT="" WIDTH=515
HEIGHT=73></CENTER>
<BR CLEAR=all>
<P>
<BR>
<CENTER><H2>Current Search Assignments</H2>
<HR>
<BR><B><I><FONT COLOR="#0000FF">Click on the links below to fill
out the Profile Questionnaire.</FONT></I></B><P></P></CENTER>  <P> When creating a
<CENTER><B>CAREER THOUGHTS:</B></CENTER>  <P> When creating a
resume, decide how you are valuable, rather than how valuable you
are. <P><BR>
```

42a, 44a, 44, 46a, 46b

```
<CENTER><B>RECRUITING ASSIGNMENTS</B></CENTER> <P>
<A HREF="/cgi-bin/simprofile.html?SYSTEMS+ANALYST">SYSTEMS
ANALYST</A><BR> Responsible for servicing the in-house users to
develop applications that address specific business requirements
and translate those requirements into code in a manufacturing
environment.  Requires a Bachelors degree with HP UNIX Client
Server background.  Prefer experience with Oracle 10.7 but
emphasis is on the Client Server experience.  Salary $45-50K.  NC
Location.
<P><HR><P>
```
— 46c

```
<CENTER><A HREF="simril/simrilhm.html"><IMG
SRC="/simril/home.gif" ALT="Return to Home Page" WIDTH=212
HEIGHT=32 BORDER=0></A></CENTER><P></P></TD></TR></TABLE>
</BODY>       44b
</HTML>
```
— 46d

FIG. 3B

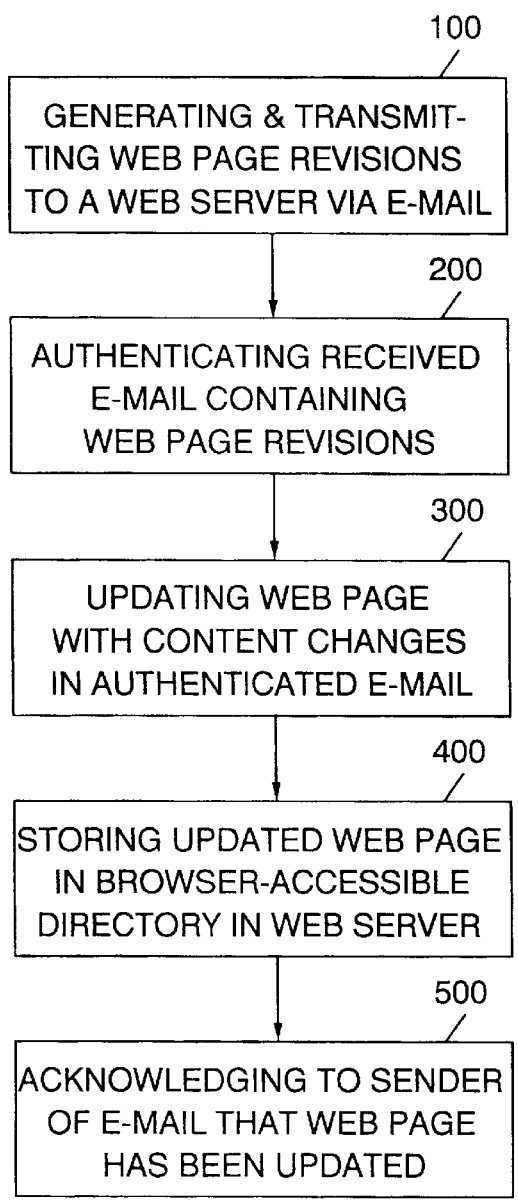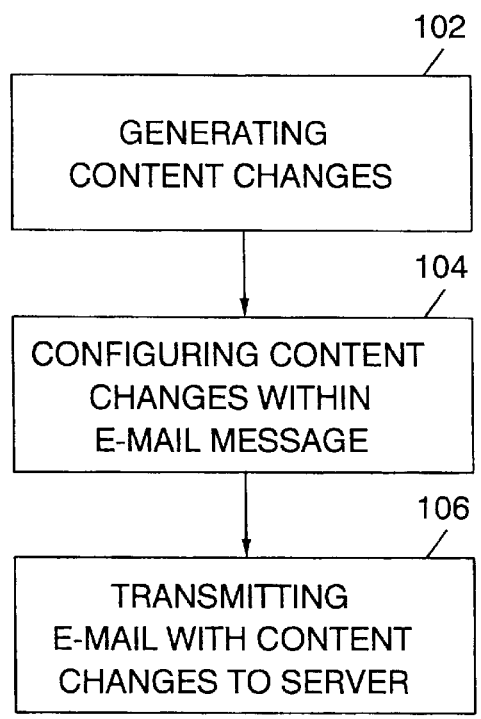

FIG. 7

```
<HTML>
<HEAD><TITLE>Robert W. Simril & Associates</TITLE></HEAD>
<BODY BACKGROUND="/simril/texture3.gif" BGCOLOR="#FFFFFF"
TEXT="#000000" LINK="#0000FF" VLINK="#800080" ALINK="#FFFFFF">
<TABLE><TR><TD WIDTH=120><BR></TD><TD WIDTH=520><CENTER><IMG
SRC="/simril/simlogo.gif" ALT="[IMAGE[" WIDTH=515
HEIGHT=73></CENTER><BR CLEAR=all><P><BR><CENTER><H2>Current
Search Assignments</H2><HR><BR><B><I><FONT COLOR=#0000FF>Click
on the links below to fill out the Profile
Questionnaire.</FONT></I></B><P></P></CENTER><BR>
<PRE><B>UPDATED: <RPMTD></B></PRE><P><BR>
<RPM>
<P><HR><P>
<CENTER><A HREF="/simril/simrilhm.html"><IMG
SRC="/simril/home.gif" ALT="Return to Home Page" WIDTH=212
HEIGHT=32 BORDER=0></A></CENTER><P></P></TD></TR></TABLE>
</BODY>
</HTML>
```

FIG. 8

| Target Command | HTML Filename | Password | Directory | RPM Tag | Port |
|---|---|---|---|---|---|
| | 65b | 65c | 65d | 65e | 65f |
| rpmtest | rpmtest.html | XXXXXXXX | /httpd/html/home/ | <RPM> | single |
| rpmmulti1 | rpmmulti.html | XXXXXXXX | /httpd/html/home/ | <RPM> | multi |
| rpmmulti2 | rpmmulti.html | XXXXXXXX | /httpd/html/home/ | <RPM2> | multi |
| rpmmulti3 | rpmmulti.html | XXXXXXXX | /httpd/html/home/ | <RPM3> | multi |
| cjrc | cjrc.html | XXXXXXXX | /httpd/html/home/johnston/community/ | <RPM> | single |
| cjrctest | cjrc.html | XXXXXXXX | /httpd/html/home/rpmtestdocs/ | <RPM> | single |
| railadv | railadv.html | XXXXXXXX | /httpd/html/home/johnston/community/ | <RPM> | single |
| pippin | pippin.html | XXXXXXXX | /httpd/html/home/rpmtestdocs/ | <RPM> | single |
| simril | simsearch.html | XXXXXXXX | /httpd/html/home/simril/ | <RPM> | single |
| rpmimage | rpmtest.gif | XXXXXXXX | /httpd/html/home/ | <RPM> | single |
| simtest | simtest.html | XXXXXXXX | /httpd/html/home/rpmtestdocs/ | <RPM> | single |
| rpmdemo | rpmdemo.html | XXXXXXXX | /httpd/html/home/ | <RPM> | single |
| davis1 | davis.html | XXXXXXXX | /httpd/html/home/davis/ | <RPM> | multi |
| davis2 | davis.html | XXXXXXXX | /httpd/html/home/davis/ | <RPM2> | multi |
| davis3 | davis.html | XXXXXXXX | /httpd/html/home/davis/ | <RPM3> | multi |
| davis4 | davis.html | XXXXXXXX | /httpd/html/home/davis/ | <RPM4> | multi |
| davis5 | davis.html | XXXXXXXX | /httpd/html/home/davis/ | <RPM5> | multi |

FIG. 12B-2

Description of pages:
Updates for job openings.

Attribute Selections     75k

RPM update frequency. Select one of two methods:
○ Number of days between updates:
    [ ] Enter number of days

-OR-

● Update period
    ○ Daily
    ● Weekley
    ○ Bi-Weekly
    ○ Monthly     75l
    ○ Quarterly Send update reminder via email?
  ○ Yes [ ] Enter number of days    75m
  ● No Copy MIS manager if reminder is sent?
  ○ Yes
  ● No    75n Copy MIS manager on "missed dates"?
  ○ Yes
  ● No    75o Is RPM authority "supervised"?
  ○ Yes [ ] Enter number of days    75p
  ● No Copy supervisor on "reminders sent" and "missed dates"?
  ○ Yes
  ● No Send RPM update acknowledgement to RPM content creator? /75q
- ● Yes
- ○ No Send RPM update acknowledgement to Supervisor? /75r
- ● Yes
- ○ No Send RPM update acknowledgement to MIS Manager? /75s
- ● Yes
- ○ No Start Date: /75t
[08/12/96] mm/dd/yy New Updates: /75u
[08/19/96] mm/dd/yy

[ Click Here To Submit Chnages ]

[ Click Here to Display a One Year Calendar ]

[ Click Here To Return To The Directory of RPM Files ]

Document: Done

| FIG. 12B-1 |
| FIG. 12B-2 |
| FIG. 12B-3 |

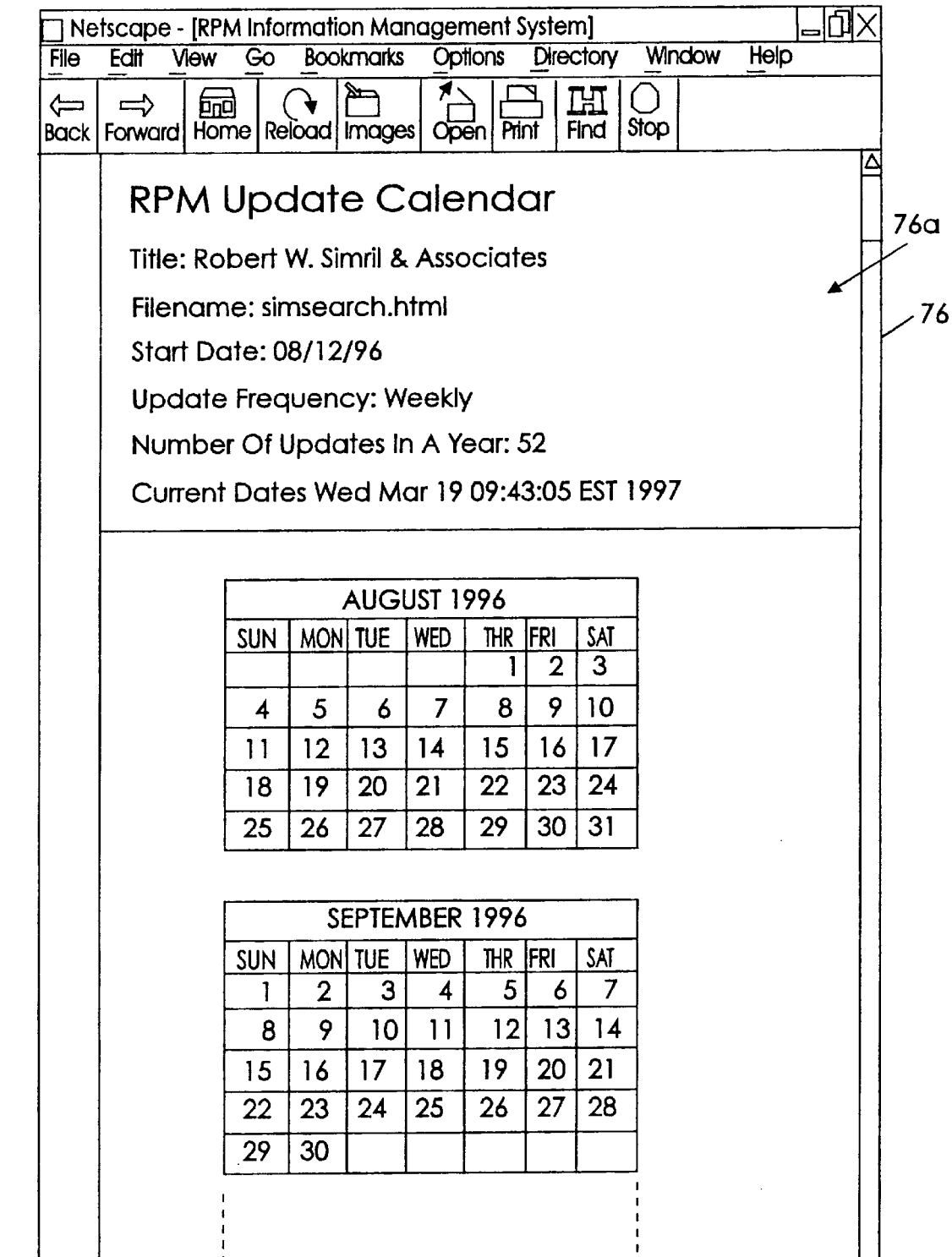

|   |   | MAY 1997 |   |   |   |   |
|---|---|---|---|---|---|---|
| SUN | MON | TUE | WED | THR | FRI | SAT |
|   |   |   |   | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 | 31 |

|   |   | JUNE 1997 |   |   |   |   |
|---|---|---|---|---|---|---|
| SUN | MON | TUE | WED | THR | FRI | SAT |
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 |   |   |   |   |   |

Check Here For RPM Reports

Check Here Return To The Directory of RPM Files

Document: Done

| FIG. 12C-1 |
| FIG. 12C-2 |

RPM Real-time Page Management

RPM Real-time Page Management software developed by Reedy Creek Direct Marketing Associates, LLC allows individuals to control the content of their web pages at any time from any location using any Internet email program.

This breakthrough in technology will allow many people the freedom and convenience they need to make their web pages dynamic and up to date.

RPM
Real-time Page Management

Reedy Creek Direct Marketing Associates, LLC

FIG. 14B

```
<HTML>
<HEAD><TITLE>Robert W. Simril & Associates</TITLE></HEAD>
<BODY BACKGROUND="/simril/texture3.gif" BGCOLOR="#FFFFFF" TEXT="#000000"
LINK="#0000FF" VLINK="#800080" ALINK="#FFFFFF">
<TABLE><TR><TD WIDTH=120><BR></TD><TD WIDTH=520><CENTER><IMG
SRC="/simril/simlogo.gif" ALT="" WIDTH=515 HEIGHT=73></CENTER><BR
CLEAR=all><P><BR><CENTER><H2>Current Search Assignments</H2><HR><B><I><FONT
COLOR="#0000FF">Click on the links below to fill out the Profile
Questionnaire.</FONT></I></B><P></P></CENTER><BR>
<PRE><B>UPDATED: <RPMTD></B></PRE><P><BR>
<RPM>

<P><HR><P>
<CENTER><A HREF="/simril/simrilhm.html"><IMG SRC="/simril/home.gif" ALT="Return to Home
Page" WIDTH=212 HEIGHT=32 BORDER=0></A></CENTER><P></P></TD></TR></TABLE>
</BODY>
</HTML>
```

| FIG. 14C-1 |
| FIG. 14C-2 |

92

```
<HTML>
<HEAD><TITLE>Robert W. Simril & Associates</TITLE></HEAD>
<BODY BACKGROUND="/simril/texture3.gif" BGCOLOR="#FFFFFF" TEXT="#000000"
LINK="#0000FF" VLINK="#800080" ALINK="#FFFFFF">
<TABLE><TR><TD WIDTH=120><BR></TD><TD WIDTH=520><CENTER><IMG
SRC="/simril/simlogo.gif" ALT="" WIDTH=515 HEIGHT=73></CENTER><BR
CLEAR=all><P><BR><CENTER><H2>Current Search Assignments</H2><HR><BR><B><I><FONT
COLOR="#0000FF">Click on the links below to fill out the Profile
Questionnaire.</FONT><I></B><P></P></CENTER><BR>

<PRE><B>UPDATED: Fri Mar 7 11:11:04 EST 1997
</B></PRE><P><BR>
<CENTER><B>CAREER THOUGHTS: </B></CENTER><P> When creating a resume, decide
how you are valuable, rather than how valuable you are. <P><BR>
<CENTER><B>RECRUITING ASSIGNMENTS</B></CENTER><P>
<A HREF="/cgi.bin/simprofile.html?SYSTEMS+ANALYST">SYSTEMS ANALYST</A><BR>
Responsible for servicing the in-house users to develop applications that address specific business
requirements and translate those requirements into code in a manufacturing environment.  Requires
a Bachelors degree with HP UNIX Client Server background.  Prefer experience with Oracle 10.7 but
emphasis is on the Client Server experience.   Salary $45-50K.  NC Location<P>
```

```
<A HREF="/cgi.bin/simprofile.html?PLANT+PROJECT+ENGINEER">PLANT PROJECT
ENGINEER</A><BR> BSME degree with 3+ years in machine design, re-vamps.  Improve the
production process by working with operators to identify the bottlenecks and/or improve the process,
volume of production, quality by designing new process equipment.  Salary 45K, NC location.<P>
<A HREF="/cgi.bin/simprofile.html?CELL+TEAM+LEADER">CELL TEAM
LEADER</A><BR>Opportunity to lead approximately 25-30 directs in a high volume machining,
assembly manufacturing environment.  Plant operates in a Team Concept environment.  Reports to
Product Line Manager with promotional opportunity.  Requires a Bachelors degree with goals of
moving into Operations.  Salary 45K.  NC location.

<P><HR><P>
<CENTER><A HREF="/simril/simrilhm.html"><IMG SRC="/simril/home.gif"  ALT="Return to Home
Page" WIDTH=212 HEIGHT=32 BORDER=0></A></CENTER><P></P></TD></TR></TABLE>
</BODY>
</HTML>
```

FIG. 14C-2

PLANT PROJECT ENGINEER

BSME degree with 3+ years in machine design, re-vamps. Improve the production process by working with operators to identify the bottlenecks and/or improve the process volume of production, quality by designing new process equipment. Salary 45K, NC location.

CELL TEAM LEADER

Opportunity to lead approximately 25-30 directs in a high volume machining assembly manufacturing environment. Plant operates in a Team Concept environment. Reports to Product Line Manager with promotional opportunity. Requires a Bachelors degree with goals of moving into Operations. Salary 45K NC location.

Return to Home Page

FIG. 14D-2

| FIG. 14D-1 |
| FIG. 14D-2 |

FIG. 14D 5,937,160

SYSTEMS, METHODS AND COMPUTER PROGRAM PRODUCTS FOR UPDATING HYPERTEXT DOCUMENTS VIA ELECTRONIC MAIL

FIELD OF THE INVENTION

The present invention relates generally to data processing systems, methods, and computer program products, and more particularly to data processing systems, methods, and computer program products for updating hypertext documents.

BACKGROUND OF THE INVENTION

The Internet is a worldwide decentralized network of computers having the ability to communicate with each other. The Internet has gained broad recognition as a viable medium for communicating and interacting across multiple networks. Until fairly recently, the Internet was used mostly for communicating via electronic mail (e-mail), or for locating and transferring data through such services as "Gopher", "WAIS", "Archie", and "File Transfer Protocol" (FTP). The programs for locating and transferring data typically utilized menus and other text-based interfaces.

The World Wide Web (hereinafter the "Web") was created in the early 1990's, and is comprised of servers (computers connected to the Internet) having hypertext documents or Web pages stored therewithin. These Web pages are accessible by client devices (hereinafter "clients") using browser programs (hereinafter "browsers") utilizing the Hypertext Transfer Protocol (HTTP) and the Transmission Control Protocol/Internet Protocol (TCP/IP). Exemplary browsers include Netscape Navigator™ (Netscape Communications Corporation, Mountain View, Calif.) and Internet Explorer® (Microsoft Corporation, Redmond, Wash.). Browsers typically provide a graphical user interface for retrieving and viewing Web pages hosted by HTTP servers.

A Web page, using a standard page description language known as HyperText Markup Language (HTML), typically displays text and graphics, and can play sound, animation, and video clips. HTML provides basic document formatting and allows a Web page developer to specify hypertext links (typically manifested as highlighted text) to other servers and files. When a user selects a particular hypertext link, the Web browser reads and interprets the address, called a URL (Uniform Resource Locator) associated with the link, connects the client with the Web server at that address, and makes a TCP/IP request for the Web page identified in the link. The server then sends the requested Web page to the client in HTML format which the browser interprets and displays to the user.

A URL gives the type of resource being accessed (e.g., Gopher, WAIS) and optionally the path of the file sought. For example: resource://host.domain/path/filename, wherein the resource can be "file", "http", "gopher", "WAIS", "news", or "telnet". Through the Web, users can access the various Internet services, including Gopher, Telnet, and FTP.

The World Wide Web has become a popular medium for the exchange of information and for electronic commerce. Literally millions of new Web pages have been developed in the past several years as more and more individuals, businesses and organizations have discovered the power of Internet marketing. Increasingly however, many of these Web pages become "stale" because their contents are not being updated on a regular basis. One reason for this is that many Web page content providers rely on technical personnel to perform the steps necessary to update a Web page. Many content providers lack the skill required to update a Web page or may not have access to the server hosting a Web page for security or other reasons. Granting content providers access to a server hosting a Web page is considered a security risk because with such access often comes the rights to delete, copy, move and rename files and directories on the server. As a result, significant time delays may often occur between the development of fresh Web page content and the actual implementation of the fresh content within the Web page.

A variety of Web page creation and editor tools such as Page Mill® (Adobe Systems Incorporated, San Jose, Calif.) or Front Page® (Microsoft Corporation, Redmond, Wash.), which require little if any knowledge about the various Web page programming languages, are available. Unfortunately, updating a Web page with these programs typically requires an uploading procedure, such as FTP, to send the new information to the Web page. FTP procedures can often be time consuming and somewhat difficult. Furthermore, unless a content provider has been granted access to the server hosting the Web page, the content provider may not be able to utilize FTP procedures. Consequently, presently-used methods of updating a Web page may result in time delays between the creation of content and the actual publishing of the content in a Web page.

Another drawback of FTP is that, once granted access, a user is often empowered with significant and potentially destructive capabilities with respect to files residing on a server. Consequently, FTP access is typically tightly controlled and not widely granted. As a result, large numbers of Web page content providers, especially non-technical persons, typically do not have access to Web pages for which they are responsible for maintaining content therein.

SUMMARY OF THE INVENTION

It is therefore an object of the present invention to update and/or change the content within a hypertext document, such as a Web page, rapidly and without the need for an intervening party.

It is another object of the present invention to update and/or change the content within a Web page without requiring knowledge of the various Web page programming languages.

It is another object of the present invention to update and/or change the content within a Web page without requiring access to the server hosting the Web page.

It is another object of the present invention to update and/or change the content within a Web page without granting access to delete, copy, move or rename files and directories on the server hosting the Web page.

It is another object of the present invention to provide the ability to update and/or change Web page content to multiple content providers while reducing security risks to files residing on a server hosting the Web page to be updated.

These and other objects are accomplished, according to an embodiment of the present invention, by systems, methods, and computer program products for automatically revising a hypertext document, such as a Web page, stored within a server connected to a computer network via an e-mail message transmitted by a content provider. The present invention is a server-based utility that accepts Web page revisions, instructions, and certain other control functions, authenticates them, and then automatically executes these instructions and integrates the desired changes into the appropriate Web page. The delivery of these instructions and revised content information is performed via a specially configured e-mail document delivered to a server using standard e-mail utilities.

A provider of content for a hypertext document can send an e-mail message containing revisions or additions to the document directly (or indirectly) to the server hosting the hypertext document and automatically revise the document without requiring the intervention of another party. Revisions to a hypertext document may be generated in the same manner as an e-mail message is created or independently via a source external to an e-mail utility. For example, revisions may be generated in a word processing program and automatically transmitted to a server via an e-mail message.

Operations for carrying out an embodiment of the present invention include: generating an e-mail message containing a revision to a hypertext document and identifying a markup tag contained within the hypertext document; transmitting the e-mail message to the server via the computer network; authenticating the e-mail message received by the server; replacing the identified markup tag within the hypertext document with the revision contained within the authenticated e-mail message; and storing the revised hypertext document in a directory on the server. Additional operations may include acknowledging to the sender of the e-mail message that the hypertext document has been revised.

Authenticating operations may include locating a configuration file affiliated with the hypertext document, and comparing information within the e-mail message with information within the configuration file to determine whether the revision is authorized. Various types of information may be utilized to authenticate the e-mail message and revisions contained therewithin. For example, a password in the e-mail message may be compared with a password in the configuration file. As another example, a name of the sender of the e-mail message may be compared with information in the configuration file.

In addition to text-based revisions to a hypertext document, revisions or additions to other data formats associated with the hypertext document may be made, including graphics, audio, video, and the like. An e-mail message transmitted to a server may include one or more binary files containing graphics, audio, or video data. These binary files may be stored within a directory on a server receiving the e-mail message.

Various specialized markup tags may be utilized to perform specific functions when activated by an e-mail message transmitted to a server. For example, markup tags may be utilized to "time and date stamp" a hypertext document when revised according to an embodiment of the present invention. These specialized tags may be included within an e-mail message and/or may reside within a hypertext document.

The present invention may also include an Information Management System (IMS) module which monitors all activity, manages update schedules, and creates various logs and reports. The present invention allows many content providers to update authorized Web pages in either a supervised or an unsupervised mode.

The present invention is advantageous because Web page content can be updated virtually instantaneously without granting content providers server access rights, without requiring the need for FTP, and without the need for understanding Web page programming. Updates can be made at any time, and do not require the intervention of third parties.

The present invention is also advantageous from a server security standpoint in that only pre-determined Web page files on a server can be written to, and only after proper authentication. In addition, other files on a server cannot be read, nor can any files be deleted, copied, moved, or renamed. The present invention can be configured to prevent the ability to upload executable files, thus reducing the risk of rogue programs and viruses infecting a server.

Furthermore, the present invention may be configured so that permissions may not be changed with respect to files residing on the server such that archive files can be designated as executable files. When uploading attachments to e-mail messages, in accordance with an embodiment of the present invention, only files of a pre-determined type (e.g., files having the suffixes: GIF, JPG, WAV, MID) are accepted by the server. The present invention is also advantageous because "Web masters" and others responsible for maintaining a Web site on-line can be relieved of the responsibilities for updating Web page content. Thus the task of updating Web page content can be delegated to many people without increasing security risks.

BRIEF DESCRIPTION OF THE DRAWINGS

FIG. 3 includes two parts, FIGS. 3A and 3B, and illustrates an exemplary Web page in HTML format.

FIG. 4 is a flow chart schematically illustrating operations for automatically updating Web page content, according to an embodiment of the present invention.

FIG. 5 is a flow chart schematically illustrating operations for generating and transmitting Web page content changes, according to an embodiment of the present invention.

FIG. 7 illustrates a target Web page in HTML format and having a port, represented by the <RPM> tag, within the body portion.

FIG. 8 illustrates an exemplary configuration file, according to an embodiment of the present invention.

FIGS. 12A–12D illustrate exemplary embodiments of an IMS module for managing multiple providers of Web page content changes, according to an embodiment of the present invention. FIG. 12B includes three parts, FIGS. 12B1, 12B2, and 12B3. FIG. 12C includes two parts, FIGS. 12C1 and 12C2. FIG. 12D includes two parts, FIGS. 12D1 and 12D2.

FIGS. 13A–13B illustrate an e-mail message containing Web page content changes, according to an embodiment of the present invention.

FIG. 14B illustrates an exemplary target Web page HTML source file.

FIG. 14C includes two parts, FIGS. 14C1 and 14C2, and illustrates replacing the <RPM> markup tag within the target Web page HTML source file of FIG. 14B with the content changes provided within the e-mail message of FIG. 14A.

DETAILED DESCRIPTION OF PREFERRED EMBODIMENTS

Figure 1:
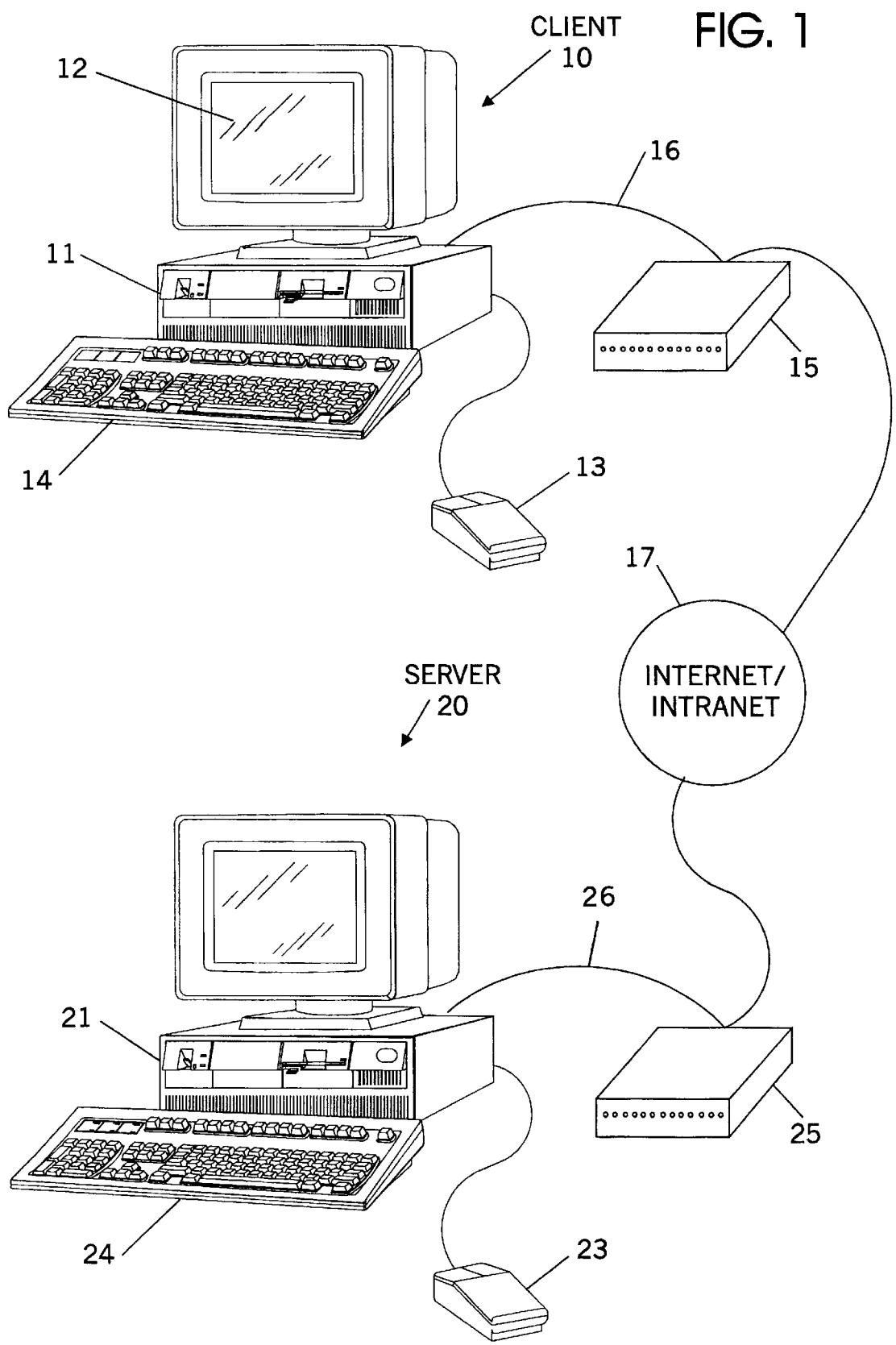
FIG. 1 schematically illustrates a client and server in communication via a computer network.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

The present invention is described below with reference to flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Client-Server Communications

Referring now to FIG. 1, a conventional client-server communications configuration within which the present invention can be implemented is schematically illustrated. As is known to those with skill in the art, client-server environments may include public networks, such as the Internet, and private networks often referred to as "Intranets." Hereinafter, all references to Web pages shall include Web pages residing on servers connected to the Internet and Web pages residing on servers connected to an Intranet. Hereinafter, the term "Internet" shall incorporate the term "Intranet" and any references to accessing the Internet shall be understood to mean accessing an Intranet as well. Hereinafter, the term "computer network" shall incorporate publicly-accessible computer networks and private computer networks. Furthermore, the term "e-mail" shall incorporate e-mail transmitted via both publicly-accessible and private computer networks. The term "hypertext document" shall include Web pages residing within HTTP servers.

Users typically access the Internet via a computer or terminal referred to as a client 10. Exemplary clients 10 may include, but are not limited to, an Apple®, IBM®, or IBM-compatible personal computer. A client 10 preferably includes a central processing unit 11, a display 12, a pointing device 13, a keyboard 14, access to persistent data storage 15, and an Internet connection 16 for connecting to the Internet 17. The keyboard 14, having a plurality of keys thereon, is in communication with the central processing unit 11. A pointing device 13, such as a mouse, is also connected to the central processing unit 11. The Internet connection 16 may be made via traditional phone lines, an ISDN link, a T1 link, a T3 link, via cable television, via an ethernet network, and the like. The Internet connection 16 may be made via a third party, such as an "Internet Service Provider" ("ISP"). The internet connection 16 may be made either by a direct connection of the client 10 to the Internet or indirectly via another device connected to the Internet. In the latter case, the client 10 is typically connected to this device via a local or wide area network (LAN or WAN). Preferably, data transfer between a client 10 and a server is equal to, or greater than, ninety-six hundred baud (9600 baud). However, other data transfer rates may be acceptable.

The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client 10 and a server (described in detail below) to store various data transferred from the server.

Preferably, a client 10 has an Intel® 80386 processor (or equivalent) with at least eight megabytes (8 MB) of RAM, and at least five megabytes (5 MB) of persistent computer storage 15 for caching. Even more preferable is an Intel® 80486 or Pentium® processor (or equivalent). However, it is to be understood that various processors may be utilized to carry out the present invention without being limited to those enumerated herein. Although a color display is preferable, a black and white display or standard broadcast or cable television monitor may be used. A client 10, if an IBM®, or IBM-compatible personal computer, preferably utilizes either a Windows® 3.1, Windows 95®, Windows NT®, Unix®, or OS/2® operating system. However, it is to be understood that a terminal not having computational capability, such as an IBM® 3270 terminal or a network computer (NC), or having limited computational capability, such as a network PC (Net PC), but having electronic mail (hereinafter referred to as "e-mail") capability, may be utilized in accordance with an embodiment of the present invention for accessing the Internet in a client capacity.

A user accesses a Web page by establishing TCP/IP communications between the client 10 and a server 20 (referred to hereinafter as a Web server) hosting the Web page. For the majority of Internet communications, a client communicates with a Web server using HTTP protocol over the TCP/IP link between the client and Web server. Typically, the data transferred between the client and the Web server are HTTP data objects (e.g. HTML data) as described above. A Web server may be a proxy which receives requests from a number of clients and routes the requests to the appropriate Web server. Web servers are often called HTTP servers.

As is known by those having skill in the art, a Web server 20 typically has a configuration similar to that of a client 10 and includes a central processing unit 21, a display 22, a pointing device 23, a keyboard 24, access to persistent data storage 25, and an Internet connection 26 for connecting to the Internet 17. It is preferable that a Web server have an Intel® Pentium® processor or equivalent, at least sixteen megabytes (16 MB) of RAM, and at least eight hundred megabytes (800 MB) of data storage. However, a Web server 20 may be implemented using other processors and via other computing devices, including, but not limited to, mainframe computing systems and mini-computers. Web server software handles requests from clients for documents, whether they are text, graphic, multimedia, or virtual. The Web server software typically runs under the operating system of the Web server.

Figure 2:
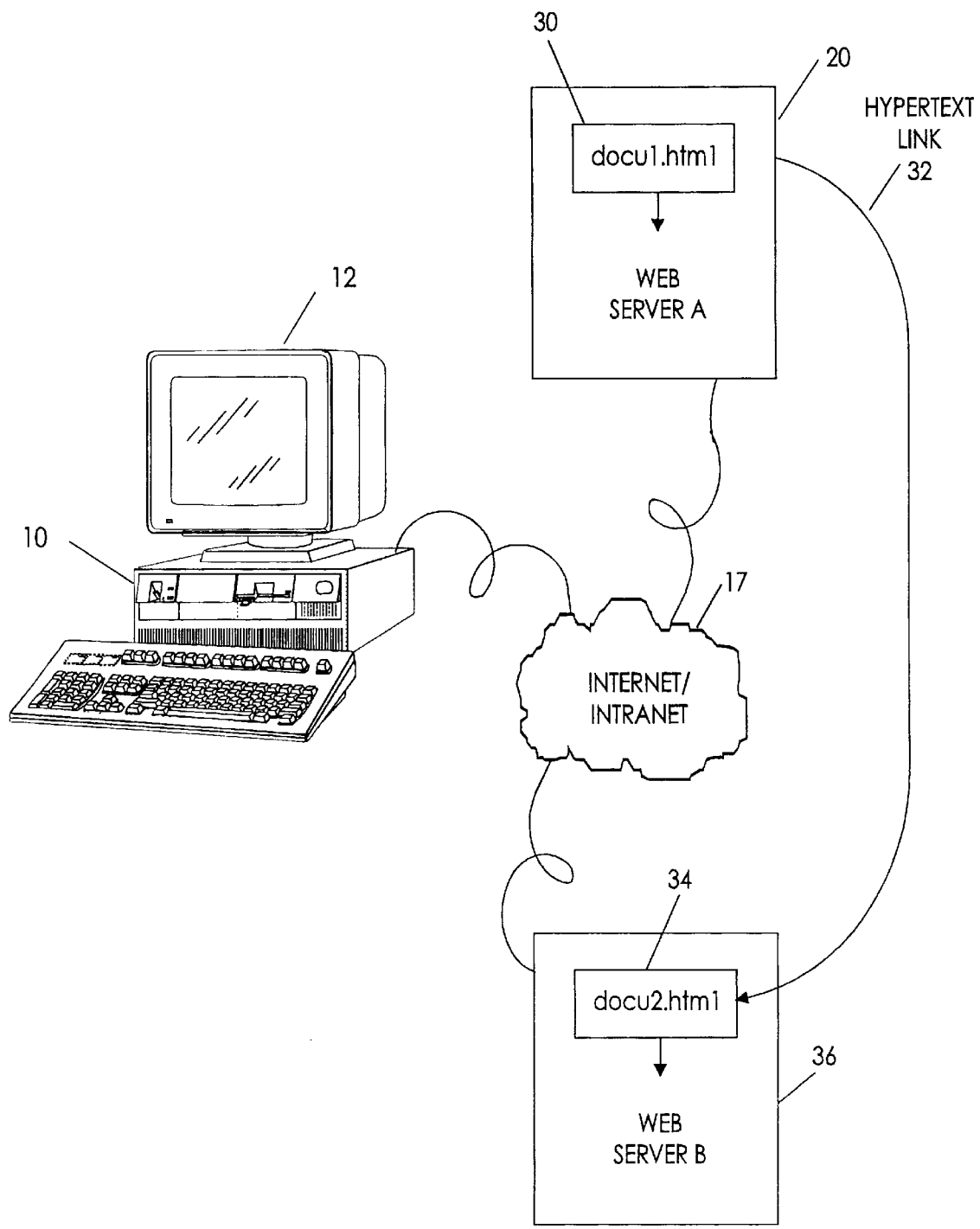
FIG. 2 schematically illustrates a client accessing a hypertext document, such as a Web page, hosted by a server.

Referring now to FIG. 2, accessing a Web page hosted by a Web server is schematically illustrated. During a typical communication, a client 10, via a browser residing on the client, makes a TCP/IP request for a Web page 30 from the host Web server 20 and displays the Web page on the client display device 12. If the displayed Web page 30 contains a hypertext link 32, the user can activate that link, and the browser will retrieve the linked Web page 34 from its host Web server 36.

It is understood that a client or Web server or other apparatus configured to execute program code embodied within computer usable media, operates as means for performing the various functions and carries out the methods of the various operations, according to an embodiment of the present invention.

Web Pages

As is known by those skilled in the art, a hypertext document's functionality comes from its ability to link text, images, and other objects within a document to text, images, and objects located elsewhere on the Internet. A hypertext document can be comprised of text, images and a variety of objects, each of which are surrounded by various tags which control format attributes and identify different portions of the document (for example: <tag_name>text</tag_name>). Hypertext documents are typically written and stored in ASCII text format using a text editor.

Web pages generally fall into one of two categories: static and dynamic. Static web pages typically have content that does not change, such as archive information and published articles. Static Web pages often run the risk of becoming stale and outdated. By contrast, dynamic web pages typically contain information that needs to be continually updated. Firms marketing products and services via the Web typically update information on their Web pages on a regular basis.

HyperText Markup Language uses so-called "markup tags," denoted by the < > symbols, with the actual tag between the brackets. Most markup tags have a beginning tag (<tag>) and an ending tag (</tag>). For example, to make a line of text appear as a heading the following tags enclose the text: <H3></H3>. (<H3>This text appears as a heading.</H3>). To make a line of text appear as a larger heading the following tags enclose the text: <H2></H2>. (<H2>This text appears as a larger heading.</H2>). To make a word or line of text appear in bold the text is enclosed by the tags: <B></B>. (<B>Bold text</B>). In addition there are numerous link tags in HTML to enable the viewer of a Web page to jump to another place in the same page, to jump to a specific place in another Web page, or to create and jump to a remote link (via a new URL) to another Web server. The HTML language is described in the HTML Reference Manual, published by Sandia National Laboratories, and available on the Internet at "http://www.sandia.gov/sci-compute/html.ref.html", which is incorporated herein by reference, in its entirety. It is to be understood that the terms "tag" and "markup tag" can be used interchangeably.

An exemplary Web page 40 in HTML format is illustrated in FIG. 3. The illustrated Web page includes a header section 42 demarcated by <HEAD> tags 42a,42b. A body section 44, demarcated by <BODY> tags 44a,44b includes various "content" portions 46a,46b,46c,46d. It is these content portions 46a,46b,46c,46d that contain information displayed to a user viewing the hypertext page with an HTML-enabled browser.

Real Time Web Page Update

The present invention allows a Web server to receive instructions and Web page content additions and/or revisions from a user, authenticate the received information, and automatically integrate the content additions and/or revisions into the appropriate Web page. The Web page receiving the content additions and/or revisions may be hosted by the Web server receiving the user instructions or may reside on a different Web server.

Referring now to FIG. 4, operations for automatically updating Web page content, according to an embodiment of the present invention, include: generating and transmitting Web page content changes to a Web server via e-mail (Block 100); authenticating received e-mail message containing Web page content changes (Block 200); updating A Web page with content changes in authenticated e-mail message (Block 300); storing updated Web page in a directory in a Web server (Block 400); and acknowledging sender of e-mail message that Web page has been revised (Block 500).

Referring now to FIG. 5, operations for generating and transmitting Web page content changes (Block 100) are schematically illustrated. A user generates additions and/or revisions to the content (hereinafter referred to as "content changes") of a remotely-located Web page (Block 102). The content changes are configured within a specially formatted e-mail message (Block 104) and then transmitted from the user's client to a Web server (Block 106).

Figure 6:
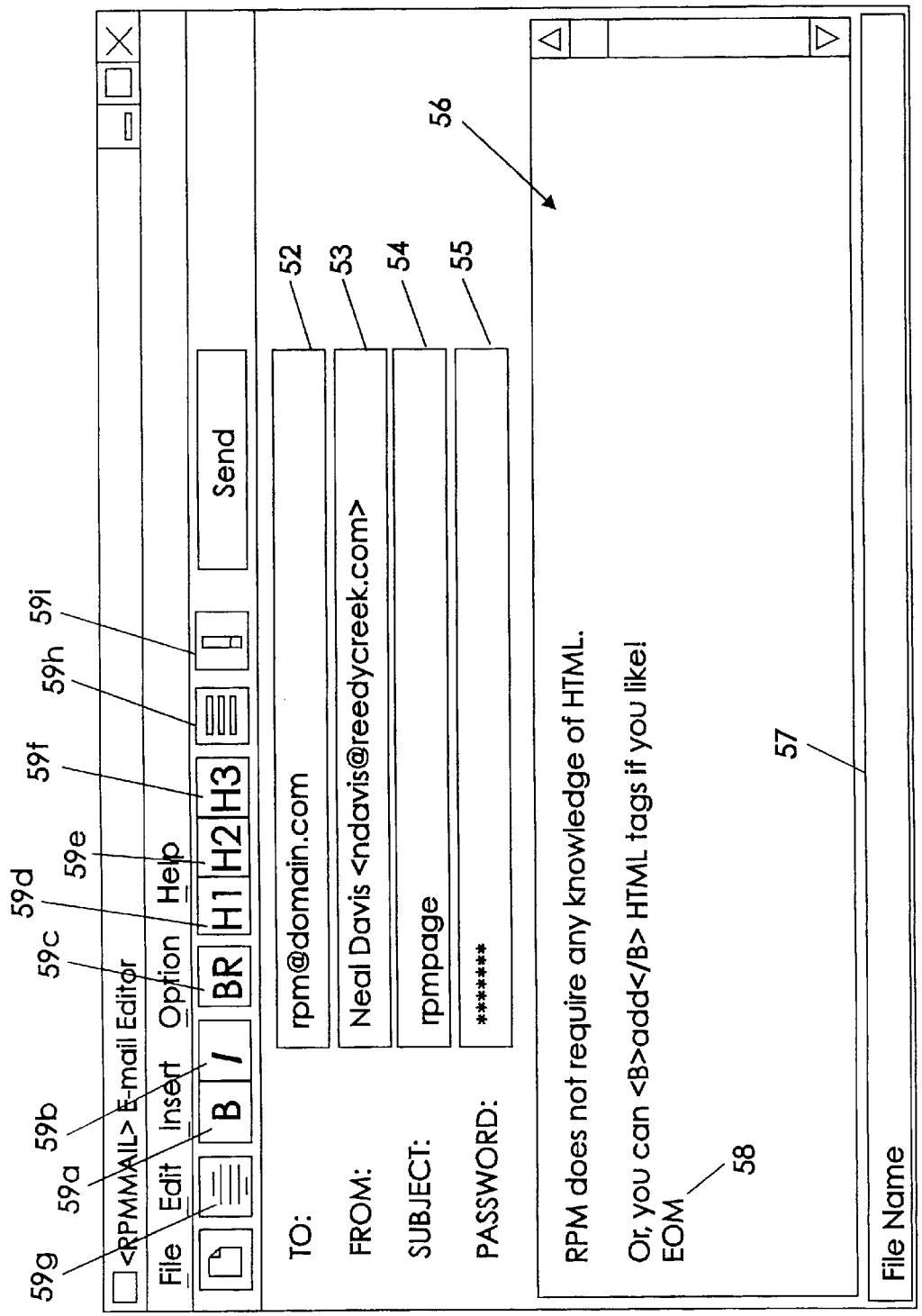
FIG. 6 illustrates a preferred e-mail message configuration, according to an embodiment of the present invention.

A preferred e-mail configuration is illustrated in FIG. 6, and includes: a "To" field 52; a "From" field 53; a "Subject" field 54; a "Password" field 55; a "Body" field 56; and an "attachment" field 57. These fields are utilized to authenticate and direct Web page content changes to the proper "target" Web pages as described in detail below. The "To" field 52 includes the proper e-mail address for the Web server that will authenticate and target the content changes. In the illustrated "To" field 52, the Web server address is "rpm@domain.com." The "From" field 53 contains the name of the user transmitting Web page content changes. This information is archived by the receiving Web server for later use in acknowledging receipt of the e-mail, and for audit trail purposes. The "Subject" field 54 is used to store a special target command which facilitates authenticating the e-mail message and identifying the location of the affiliated Web page to which the content changes are directed.

The "Password" field 55 is used to store a confidential password supplied to the user. This password facilitates authenticating the e-mail message. Furthermore, the password identifies the beginning of the Web page content changes that are to be applied to an affiliated Web page. Alternatively, the first line of the "Body" field 56 can be used to store the password, in lieu of a separate "Password" field 55.

The "Body" field 56 contains the actual content changes for an affiliated Web page. The content within the "Body" field 56 may include text, as well as links to graphics file, audio files, and video files for inclusion within an affiliated Web page. Preferably, the content within a "Body" field 56 is intended for a specific port within a respective Web page. The "Attachment" field 57 is used for attaching any binary file including, but not limited to, graphical or image files, audio files, or video files. The closing line of the content changes within the "Body" field 56 includes an "EOM" (End of Message) command 58. The EOM command 58 is used to identify the end of the content changes being transmitted via the e-mail message, and is also used as a final authentication of the content changes. As would be understood by those having skill in the art, other commands could be substituted for the EOM command 58 to signal the end of content changes. Additional information, such as signatures or embedded file attachments, can be added to an e-mail message after the EOM command without affecting the revision process of a Web page.

Internet e-mail via Simple Mail Transfer Protocol (SMTP) is a preferred delivery medium for carrying out Web page modifications in accordance with an embodiment of the present invention. As is known to those with skill in the art, unlike other Internet functions including FTP and Telnet which require continuous log-in sessions with a host Web server, Internet e-mail submits files without requiring a continuous log-in session. Accordingly, considerable security advantages are realized, such as preventing password scanning software from running, providing tight control of user access, and providing highly limited user authority. For example, using the present invention, a user can prevent server files from being read, copied, deleted, moved, or renamed, without authorization. Also, the uploading of executable files can be prevented. Furthermore, only one server file can be written to, and that is limited to the area accessed by the port contained in the HTML source file designated in the configuration file, and then only when all authentication tests have been successfully performed. The present invention can be configured such that attached files can only be uploaded to the server directory containing the corresponding revised HTML file. The elimination of continuous log-in sessions reduces the demand on client, server, and network system resources and bandwidth. Additionally, Web page content changes are prepared in advance of being delivered to the Web server. Consequently, upon delivery, Web server processing time is brief.

Virtually any commercially available e-mail utility may be used to create and edit Web page content changes according to an embodiment of the present invention. An e-mail utility may be modified to permit the addition of markup tags to content changes provided in the body portion of an e-mail message, as illustrated in FIG. 6. The illustrated e-mail editor includes multiple buttons 59a,59b,59c,59d, 59e,59f,59g,59h,59i for frequently used markup tags. The tags generated by these buttons are known to those skilled in the art, and will not be discussed. Data encryption techniques may be utilized to encode and decode e-mail messages containing Web page content changes and to encode and decode the password.

A Web page "target" to be updated in accordance with an embodiment of the present invention includes one or more "ports" positioned within the Web page and configured to accept content changes. Each port is invisible to users viewing the Web page with a browser. Each port allows a content provider to access a defined area of the Web page and to make changes and additions to the content therewithin without disturbing other portions of the Web page. A port may also encompass the entire area of a Web page, thus allowing the content provider to revise the entire page.

Referring now to FIG. 7, a target Web page 60 in HTML format is illustrated having a port 62, represented by the <RPM> tag 62a, within the body portion 64 thereof. The <RPM> tag 62a may be placed anywhere within the body portion 64 (defined by <BODY> tags 64a,64b) to identify where content changes are to be inserted. It is to be understood that tags having characters other than those illustrated may be used, without limitation. In addition, the <RPM> tag 62a, or other unique markup tag, may be placed anywhere within a Web page, or may encompass the entire Web page (leaving it as the sole entry on the Web page), to identify where content changes are to be inserted. Each port within a Web page has a unique configuration file associated therewith which contains authentication and target data specific to the port. A configuration file is preferably created on the Web server each time a new Web page is created. The information within a configuration file determines how incoming e-mail messages containing Web page content changes are authenticated, routed, and processed. Each configuration file preferably includes: the file name of the Web page containing a respective port; a password for accessing the Web page file; the directory within which the Web page file resides within a Web server; the identifying tag for the respective port; and commands associated with the respective port.

An exemplary configuration file 65 is illustrated in FIG. 8. Included in the illustrated configuration file 65 are the following: "Target Command" 65a for identifying respective Web pages; "HTML Filename" 65b for identifying the HTML source file that generates a respective Web page when viewed by a browser; "Password" (encrypted or unencrypted) 65c for authenticating incoming e-mail messages; "Directory" 65d for indicating the location of browser-accessible HTML source files and other files affiliated with a respective Web page; "RPM Tag" 65e for identifying unique ports within a Web page; and "Port" 65f for indicating whether each port is "multi" or "single." "Single" designates a Web page with one port. Whenever a content revision is received, its text is sent directly to the port on the appropriate Web page where it replaces the <RPM> tag with the revised text. "Multi" designates a Web page with more than one port. Additional text storage files are associated with a multi-port Web page to store the contents of each port. Whenever a content revision is received, its text is sent directly to the storage file associated with the appropriate port. Then, all text files are read again with their contents replacing their respective <RPM> tag, whether having just been revised or not, so as to revise the complete page. In this way, revisions to a multi-port Web page can occur independently of each other.

More than one port may be included within any portion of a Web page. When multiple ports are included within a Web page, they are preferably distinguished from one another via the addition of suffixes to the <RPM> tag. For example, <RPM01> and <RPM02> designate two different ports within a Web page. Preferably, a separate configuration file is provided for each port within a Web page. In addition, suffixes may be utilized to activate various system variables, strings, macros, and the like, and insert results generated therefrom into the designated location on a Web page. For example, the port identified by the tag <RPMTD> could be used to insert a time and date "stamp" within a Web page.

Figure 9A:
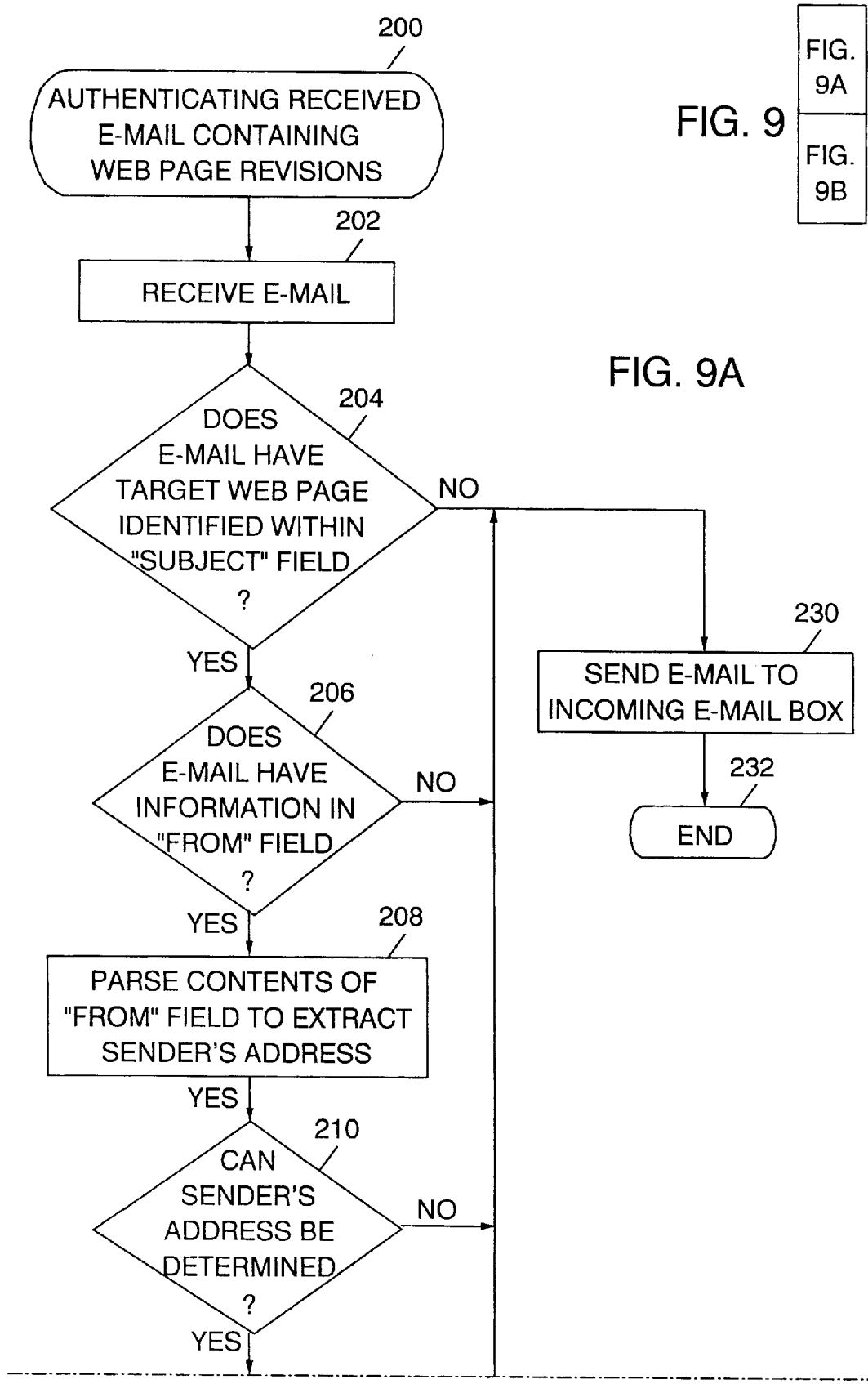
FIG. 9 includes two parts, FIGS. 9A and 9B, and is a flow chart schematically illustrating operations for authenticating received Web page content changes, according to an embodiment of the present invention.
Figure 9B:
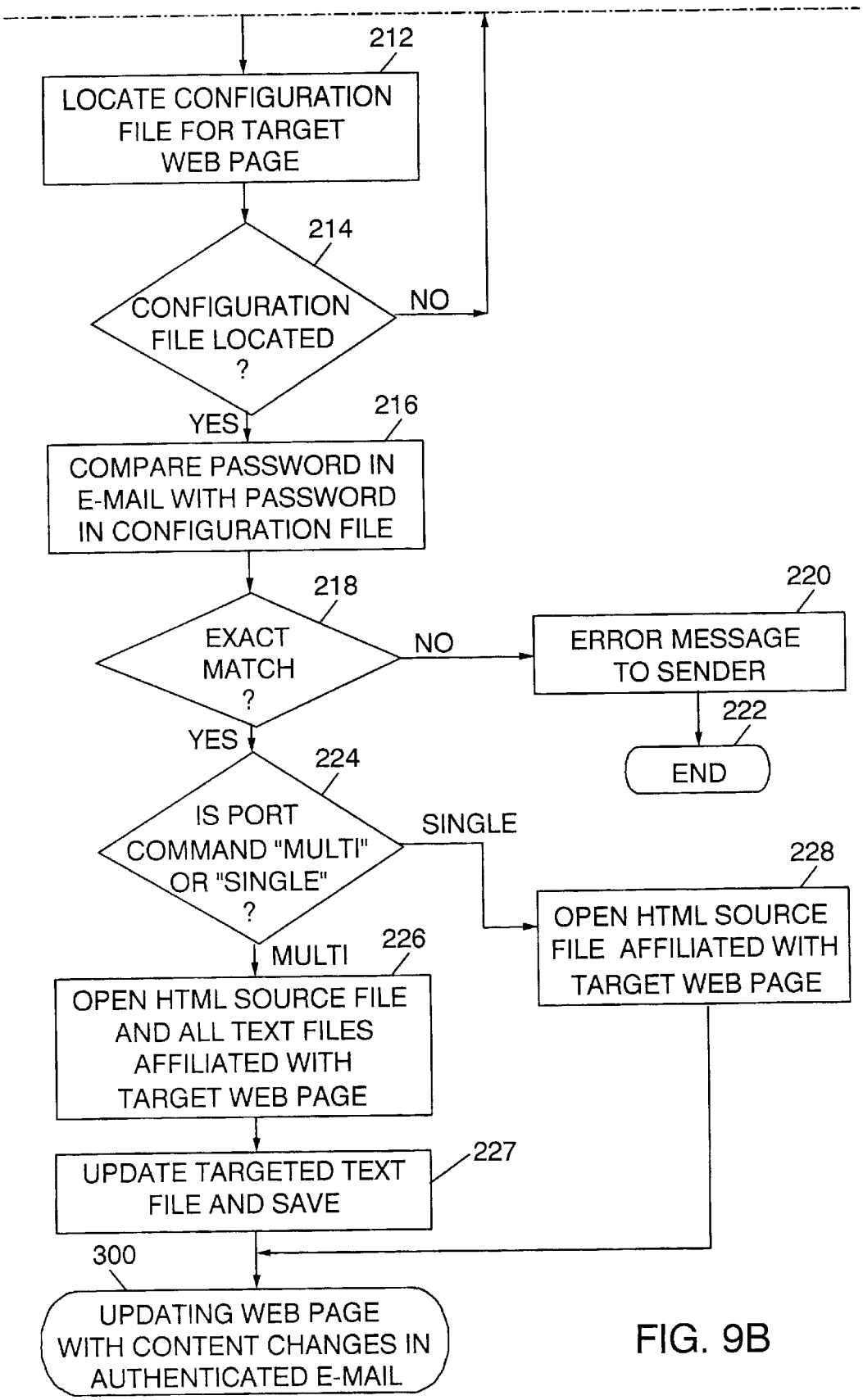

Referring now to FIG. 9, operations for authenticating received Web page content changes (Block 200) are schematically illustrated. When an e-mail message, formatted as described above, is received by a Web server (Block 202), the "Subject" field of the e-mail message is searched for identification of a target Web page (Block 204). If the "Subject" field is blank or does not identify a target Web page, the e-mail message is saved as a regular e-mail message and is stored in the appropriate user incoming e-mail box (Block 230), and operations are ended (Block 232). If the "Subject" field does identify a target Web page, this information is saved and the "From" field is searched for the sender's address (Block 206). If the "From" field is blank, the e-mail message is saved as a regular e-mail message and is stored in the appropriate user incoming e-mail box (Block 230), and operations are ended (Block 232). If the "From" field does contain the sender's address, the address is saved.

The sender's address is then parsed to remove alias names (Block 208). If the e-mail address of the sender can not be determined from the contents of the "From" field (Block 210), the e-mail message is saved as a regular e-mail message and is stored in the appropriate user incoming e-mail box (Block 230), and operations are ended (Block 232).

If the e-mail address of the sender can be determined from the contents of the "From" field (Block 210), a search is initiated for the configuration file affiliated with the target Web page identified by the target command within the "Subject" field (Block 212). If a configuration file cannot be located for the identified port (Block 214), the e-mail message is saved as a regular e-mail message and is stored in the appropriate user incoming e-mail box (Block 230), and operations are ended (Block 232). If a configuration file can be located for the targeted port (Block 214), the contents of the information contained within the body portion is parsed line by line to locate the password. When located, the password is compared with the password (encrypted or unencrypted) in the configuration file (Block 216). If an exact match is not found (Block 218), an error message is generated and transmitted to the sender of the e-mail (Block 220) and operations are ended (Block 222). If an exact match is found (Block 218), all text following the password and before the EOM command is considered to comprise the intended content revisions. The configuration file is checked to determine if the port is "multi" or "single" (Block 224).

Still referring to FIG. 9, if the port command is "multi" (Block 224), which indicates the presence of more than one port within the Web page, the HTML source file and all text files affiliated with the targeted Web page are opened (Block 226). The text file associated with the targeted port is then revised with the contents of the authenticated e-mail message and saved (Block 227). The remaining text files remain unchanged and operations proceed to steps for modifying the targeted Web page (Block 300). If the port command is "single" (Block 224), which indicates the presence of only one port within the Web page, the HTML source file affiliated with the targeted Web page is opened (Block 228), and operations proceed to steps for modifying the targeted Web page (Block 300).

Figure 10:
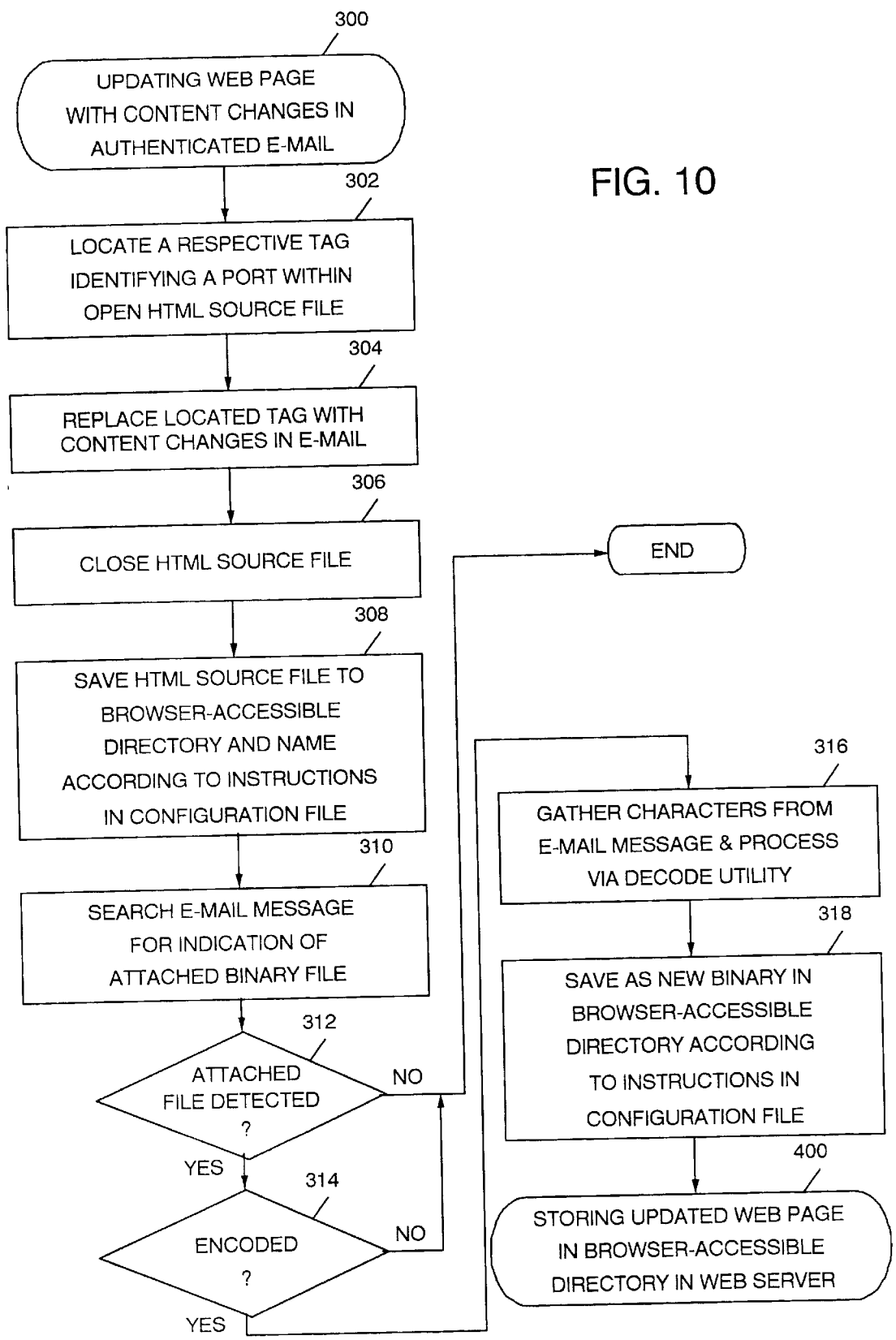
FIG. 10 is a flow chart schematically illustrating operations for updating a Web page with authenticated content changes, according to an embodiment of the present invention.

Referring now to FIG. 10 operations for updating a Web page with authenticated content changes (Block 300) are schematically illustrated. For each port identified in a respective authenticated e-mail message, a respective tag is located within an open HTML source file (Block 302). Each located tag is replaced, line by line, with the respective text from the authenticated e-mail message until an EOM command, or other similar command, is detected (Block 304). When an EOM command is detected, the HTML source file is closed if "single" port (Block 306). If "multi" port, the contents of all associated text files (Block 227) replace their corresponding tag found within the HTML source file. The HTML source file is then closed (Block 306). The HTML source file is then saved to a server directory, preferably a browser-accessible directory, and named according to instructions found in the configuration file for the respective port (Block 308). The term browser-accessible directory means that users can view files therewithin via a browser program. It is to be understood that it is not necessary that the Web server receiving an e-mail message containing content changes for a targeted Web page be the same Web server hosting the targeted Web page. A Web server receiving an e-mail message may forward the e-mail message to another Web server actually hosting the target Web page.

As is known to those having skill in the art, non-text files, including, but not limited to audio, video and graphics files, may be included with an e-mail message as attachments. Non-text files are often referred to as binary files. Because e-mail messages typically only transmit ASCII text characters, the contents of binary files must typically be converted to ASCII text using an encoding routine such as Multipurpose Internet Mail Extensions (MIME). As is known to those having skill in the art, MIME is a standard that allows graphics and multimedia information to be included in Internet documents such as e-mail messages. Upon receipt, the encoded text is decoded and the contents of the file are converted back into binary form. Accordingly, the body of an authenticated e-mail message may include a command identifying the presence of an attached (encoded) binary file embedded in the body of the e-mail message. The present invention allows the body portion of an authenticated e-mail message to be searched for "content-type" information indicating the presence of an attached binary file (Block 310). If an attached file is detected (Block 312), and can be decoded (Block 314), all subsequent characters are gathered from within the e-mail document and processed through the appropriate decoding utility so that its contents may be converted back into a binary file (Block 316). An exemplary encoding/decoding utility is MIME. The attached binary file is then saved as a new binary file to the same browser-accessible directory containing the affiliated HTML source file using instructions found in the respective configuration file (Block 318), and operations proceed to steps for storing the updated Web page in the Web server (Block 400).

Figure 11:
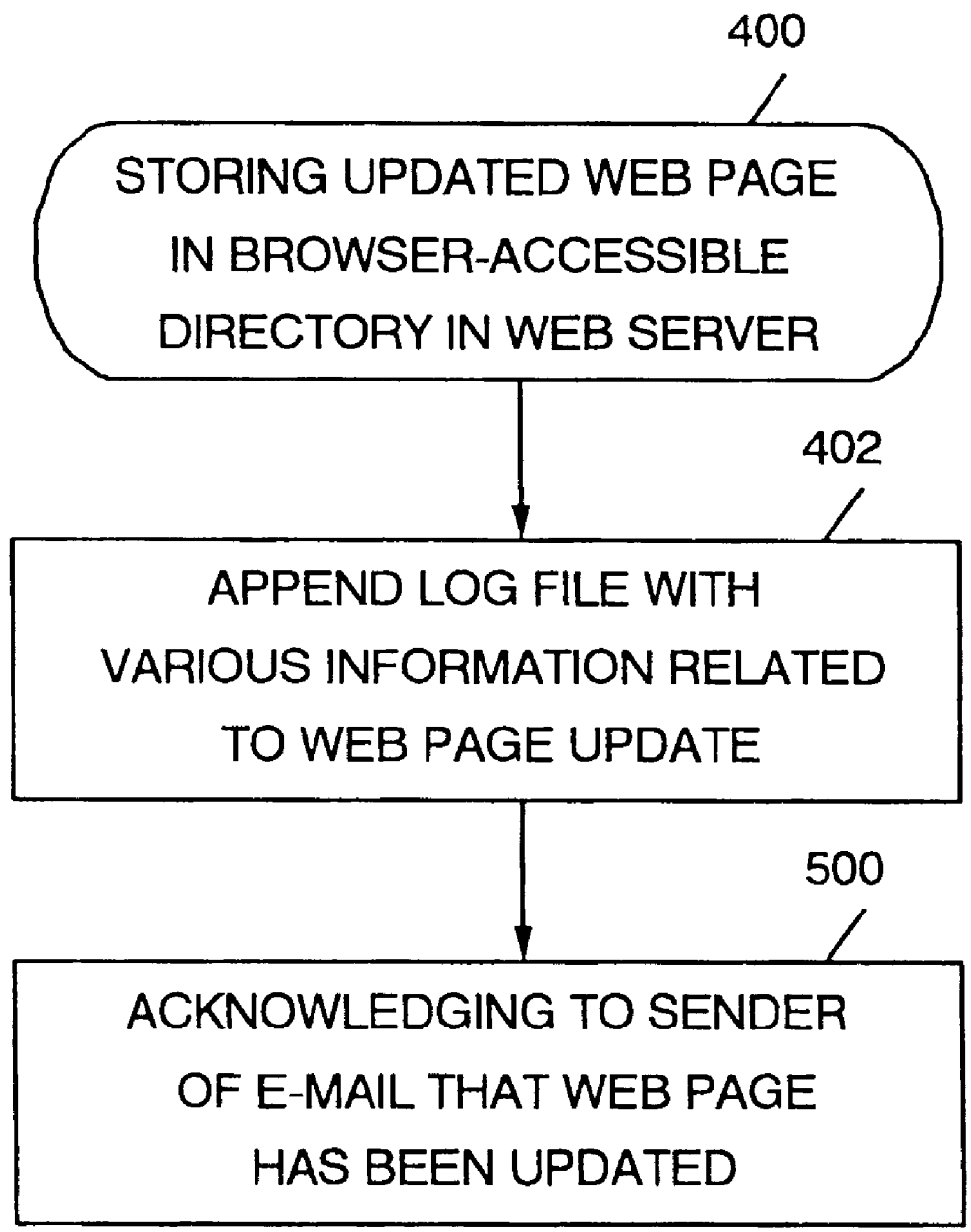
FIG. 11 is a flow chart schematically illustrating operations for storing an updated Web page in a directory in a Web server, according to an embodiment of the present invention.

Referring now to FIG. 11, operations for storing the updated Web page in a browser-accessible directory in a Web server (Block 400), according to an embodiment of the present invention, are schematically illustrated. A log file is preferably appended with the current time and date stamp along with the e-mail address of the sender, the target command, the tag replaced with information from the incoming e-mail message, and the port command (Block 402). An acknowledgement message that the Web page has been successfully updated may be transmitted, preferably via e-mail, to the sender of the e-mail message (Block 500), as well as all others designated in an Information Management Systems (IMS) module (described in detail below), when the IMS module is in active use.

Whenever an e-mail message containing Web page content changes as described above is received by a Web server, the Web page revision process is launched immediately and promptly completed. Each modified Web page is stored on the Web server as a completed HTML document, and is immediately available for viewing. This means that the download wait time is the least it can possibly be and that the consumption of system resources is held to a minimum. This is especially important for high traffic Web sites.

The present invention is advantageous over known methods of revising Web pages such as using Server Side Includes (SSI), or equivalent "on the fly" techniques. SSI enhanced Web pages utilize a special sequence of characters or tokens to designate where update information is to be inserted within a Web page. Unlike the present invention, an SSI server waits to access the actual update information only when the browser calls for the Web page. The Web page is then revised "on the fly." This means that the user typically has to wait for the Web page to be newly created each and every time it is requested. The result is slower download time and considerable consumption of system resources.

The present invention is also advantageous because many ports can be utilized within a Web page. Each port may be accessed by one or more authorized content providers. Furthermore, ports may be independently updated without disturbing other portions of the Web page, and without interfering with a user viewing the Web page with a browser.

Information Management System Module

Figure 12A:
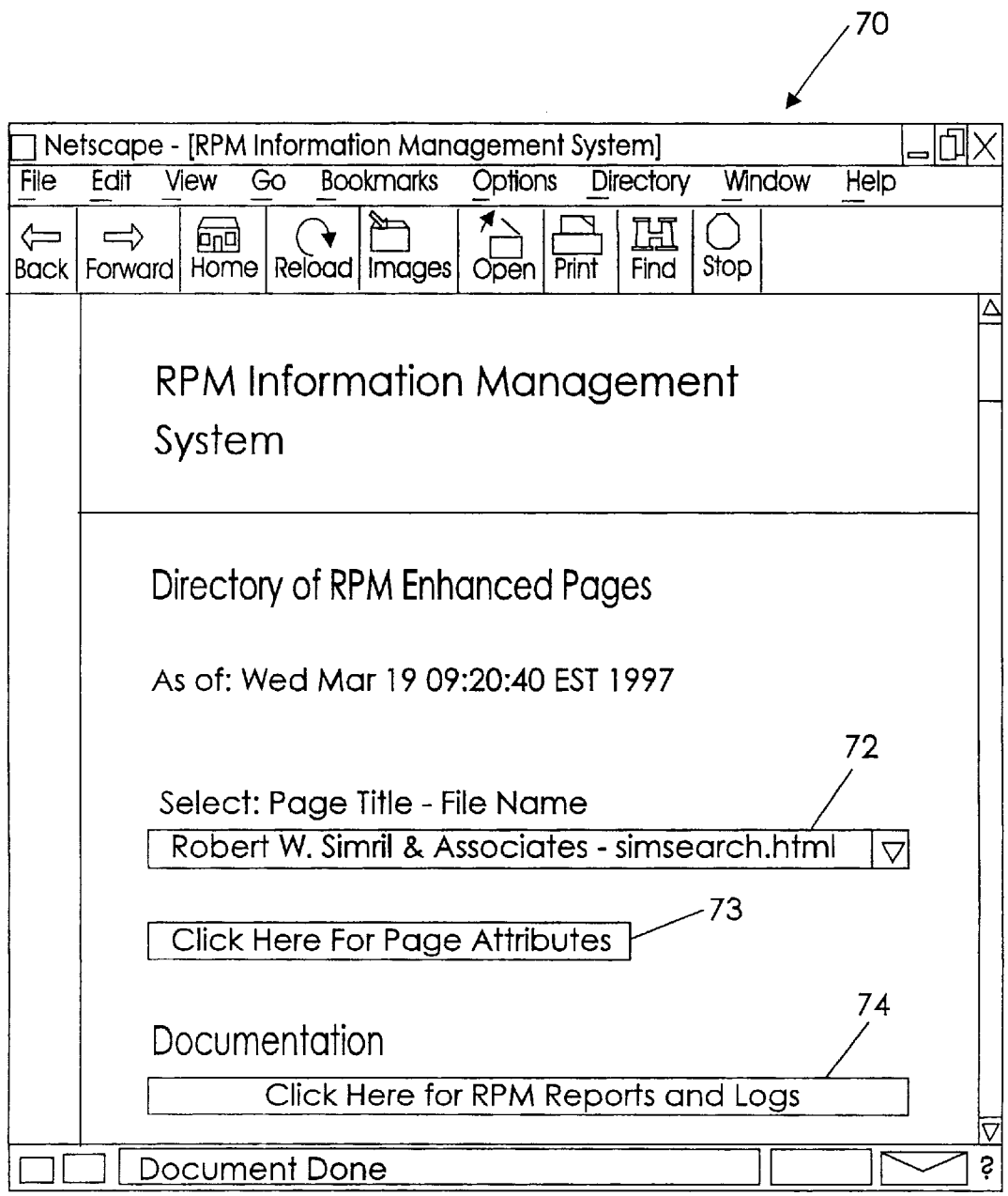

According to another aspect of the present invention, an Information Management System (IMS) module facilitates managing multiple providers of Web page content changes. The IMS module is accessible via a series of password protected Web pages. An exemplary embodiment of the IMS module is illustrated in FIGS. 12A–12D. Referring initially to FIG. 12A, a Web page selection screen 70 is presented to a user accessing the IMS module via a browser. The user can select a Web page from a drop down selection box 72. Once a Web page is selected by a user, attributes associated with the Web page can be viewed and/or modified by clicking the attribute button 73. In addition, various reports and logs can be viewed, sorted, and printed by clicking the reports button 74. Available reports are preferably sorted by various parameters FIG. 12D). A detailed calendar may be created and printed to show an update schedule for a selected Web page as illustrated in FIG. 12C.

Referring back to FIG. 12B, an attribute screen 75 for a selected Web page is illustrated. A user having authority to do so can view the attribute screen 75 via a browser. The selected Web page title, HTML source file name and date is displayed in the top portion 75a of the illustrated attribute screen 75. The following displayed information regarding the selected Web page may be modified as needed: "Department responsible for above page" 75b; "Person responsible for page content" 75c; "Person's email address" 75d; "Person's phone/ext" 75e; "Dept. Supervisor's name" 75f; "Dept. Supervisor's email address" 75g; "MIS Manager's name" 75h; "MIS Manager's email address" 75i; and "Description of page" 75j.

Figures 1, 12B:
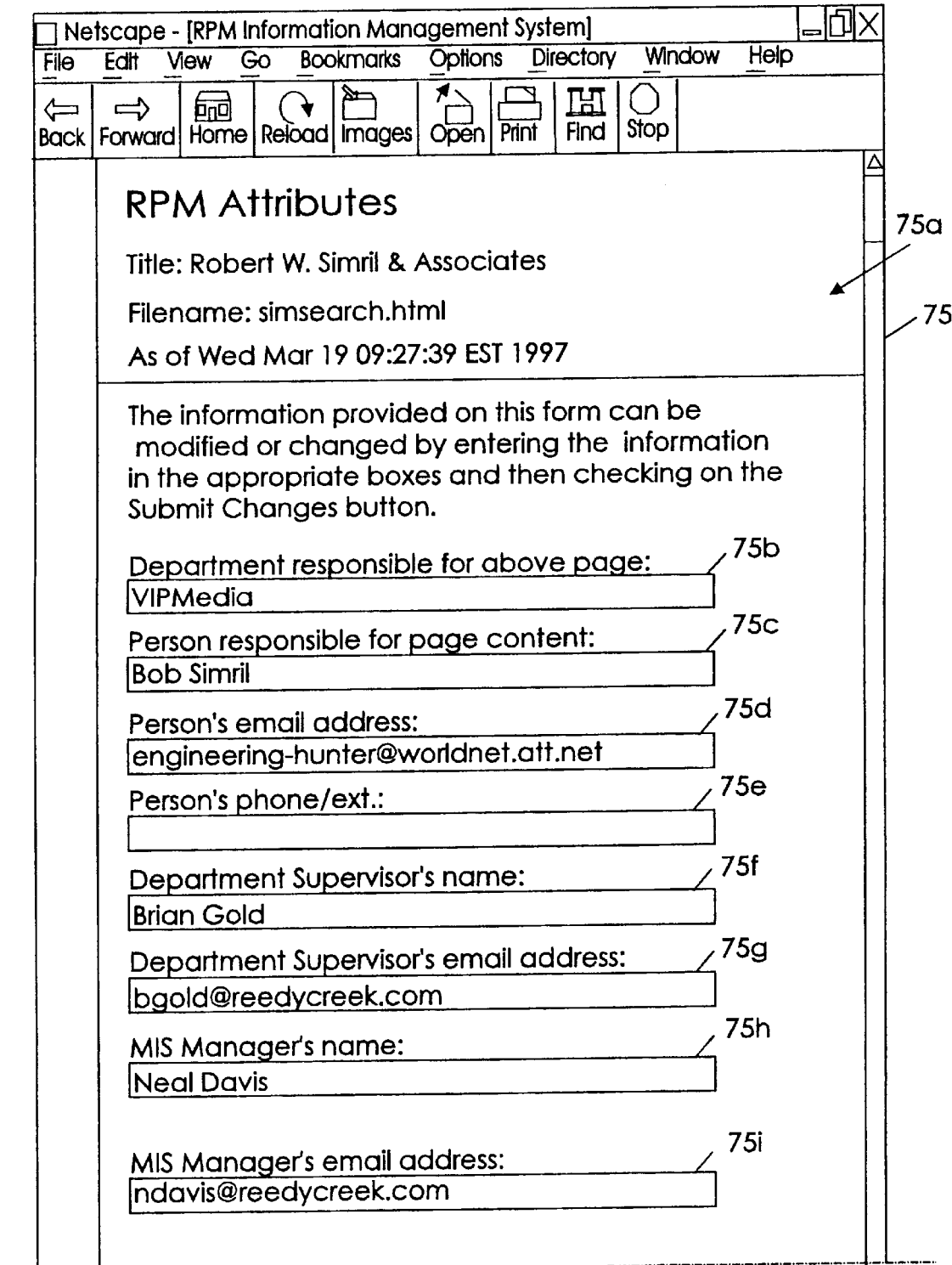

Still referring to FIG. 12B, additional attributes for a selected Web page that can be set or changed using the IMS module are provided. "RPM update frequency" 75k determines how often the contents of the selected Web page are to be updated. The user can enter either the number of days between updates or choose an update period from the available choices. This information is used to automatically generate reminders to content providers. "Send update reminder via email?" 75l determines if the content manager is to receive an e-mail reminder whenever a Web page update is about to come due. The number of days of advance notification may be entered. "Copy MIS manager if reminder is sent?" 75m allows an e-mail reminder to be sent to the MIS manager. "Copy MIS manager on 'missed dates'?" 75n allows an e-mail notification to be sent to the MIS manager if the missed date has exceeded the number of days entered. "Is RPM authority 'supervised'?" 75o determines whether an identified content provider is authorized to e-mail Web page updates directly to the Web server. If not, updates must be sent to a designated supervisor for editing or approval. The supervisor then submits the update on behalf of the content provider. "Copy supervisor on 'reminders sent' and 'missed dates'?" 75p determines whether the supervisor is to be notified of various reminders and missed dates. "Send RPM update acknowledgments to RPM content creator?" 75q determines whether an e-mail acknowledgment is automatically sent whenever a Web page update has been processed by the Web server. "Send RPM update acknowledgment to Supervisor?" 75r determines whether an e-mail acknowledgment is automatically sent to the Supervisor whenever a Web page update has been processed by the Web server. "Send RPM update acknowledgment to MIS manager?" 75s determines whether an e-mail acknowledgment is automatically sent to the MIS manager whenever a Web page update has been processed by the Web server. "Start Date" 75t sets the beginning date of the scheduler, and "Next Update" 75u overrides the next scheduled update. For each of the above attributes, a user submits his/her selections to the Web server and the selected Web page's attributes are activated immediately.

Figures 1, 12D:
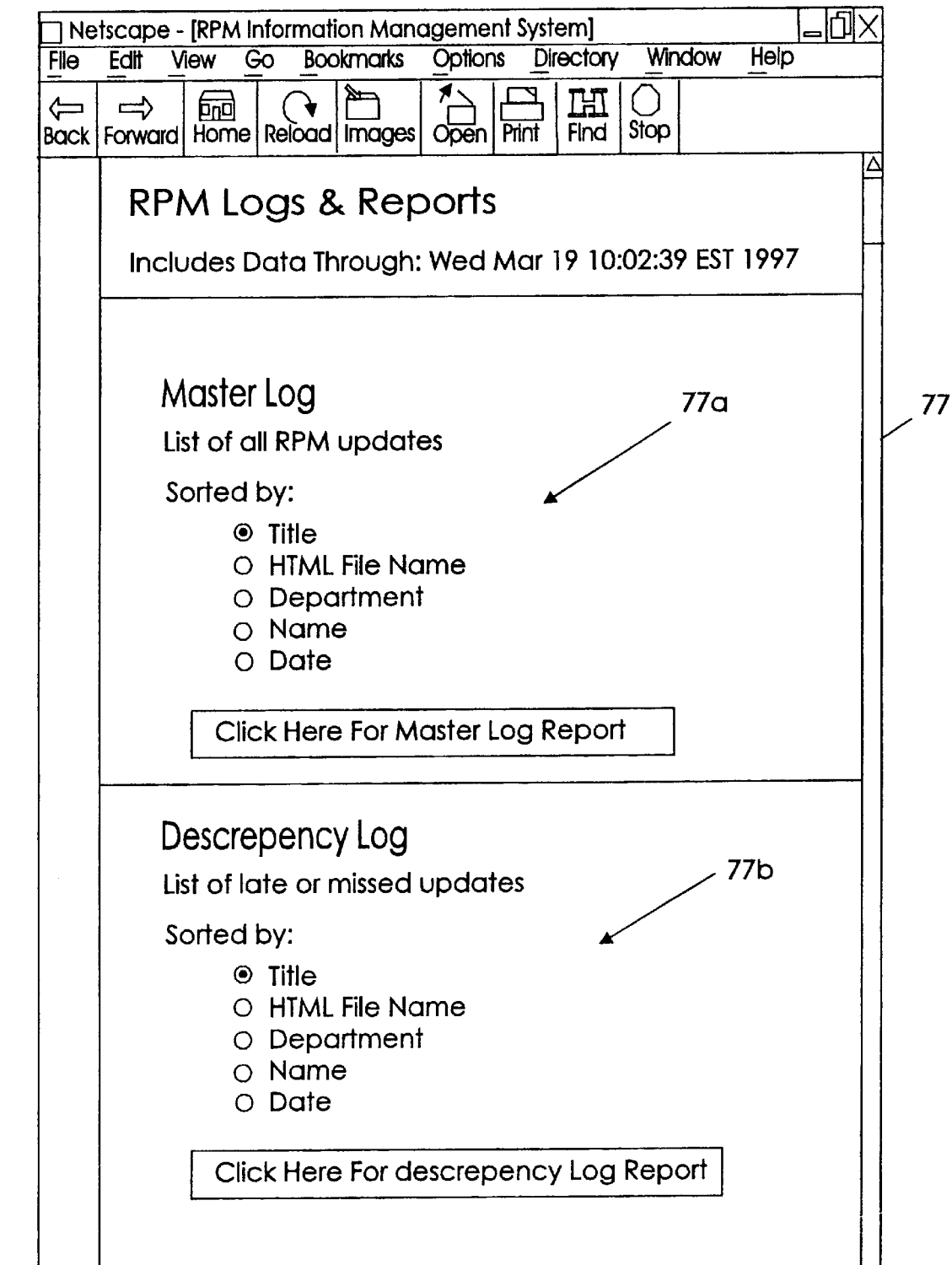
Figures 2, 12D:
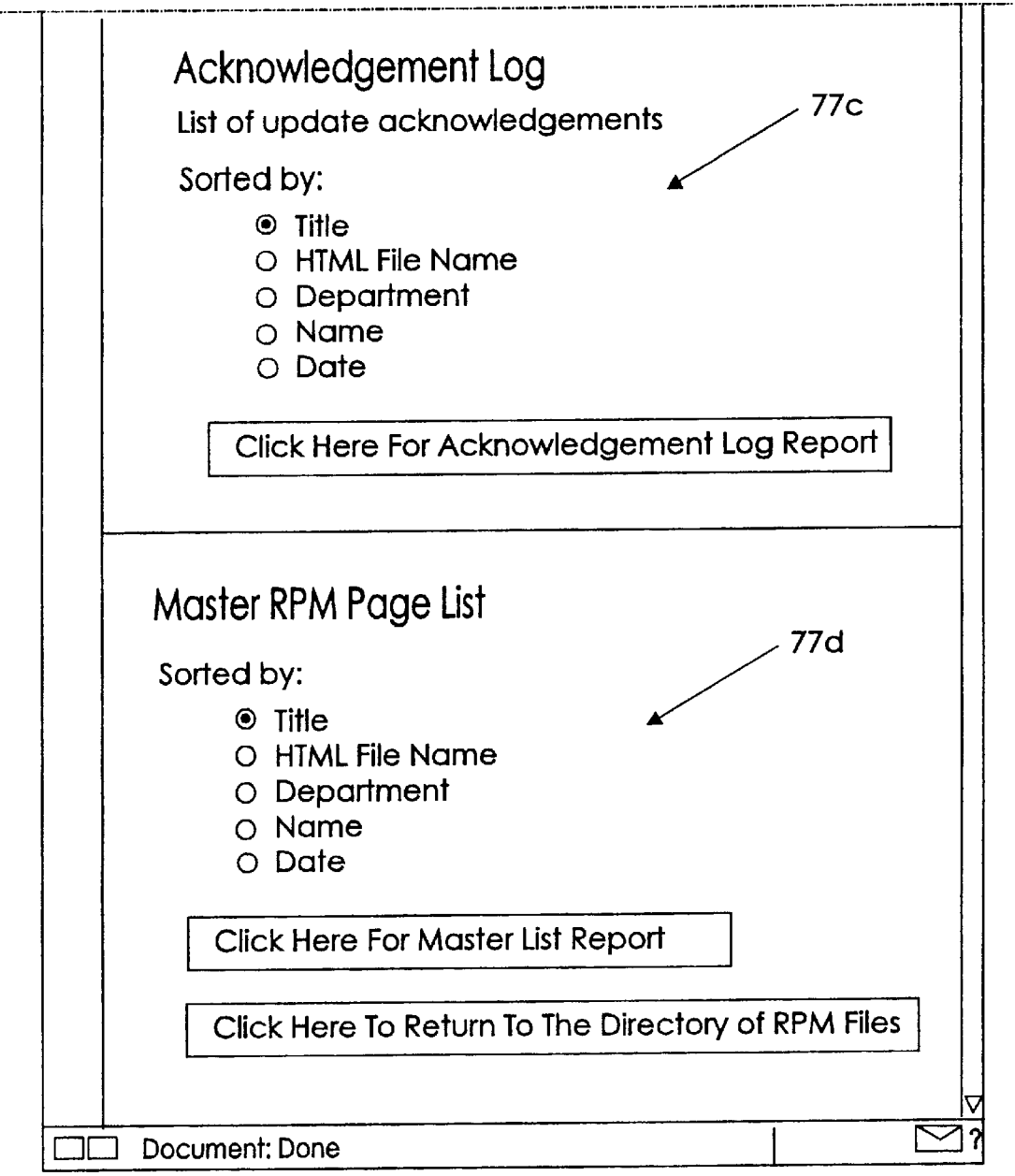
Figure 12D:
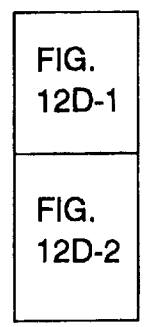

Referring to FIG. 12C, a screen 76 containing an update calendar 76a for a selected Web page is illustrated. Scheduled update dates are preferably displayed in bold and colored text, making these dates distinguishable from the others, so as to be viewable whether or not the client monitor is a color monitor. Referring to FIG. 12D, a screen 77 containing access to various reports and logs for a selected Web page is illustrated. In the illustrated embodiment, reports available include a master log report 77a, a discrepancy log report 77b, an acknowledgement log 77c, and a master RPM (Web) page list 77d.

Proprietary HTML Tags

Proprietary tags may be utilized in carrying out operations of the present invention. Because these tags are used only within the HTML source document located on the Web server, they do not appear within the actual completed online page. A family of proprietary tags may include, but is not limited to, the following:

<RPM> "RPM Single-port Identifier"

The <RPM> tag is the basic tag used to identify the location of a port within the HTML source file of a Web page. The Web server automatically replaces this tag with the Web page content changes provided within the incoming e-mail message.

<RPMx> "RPM Multi-port Identifier"

A suffix is added to the basic <RPM> tag to distinguish between ports within a multi-port Web page HTML source file. While this suffix can be either a character or a number, generally a number is used to identify individual ports. Examples include <RPMa>, <RPMb>, <RPM1>, <RPM2> and so forth. The Web server automatically replaces this tag with the content changes of the corresponding incoming e-mail message.

<RPMTD> "RPM Time & Date stamp"

When this tag is inserted within the content changes for a Web page, or within the HTML source file for the Web page, the time and date of the most recent update is automatically inserted in place of the tag. To this tag can be added other HTML tags to further enhance the display of this information. For example, <B><RPMTD></B> designates that the time and date stamp will be displayed in "bold" characters.

A tag can be defined as "any unique set of keyboard symbols used to designate the location and control the placement of incoming page revisions and also to cause specific tasks to be executed". These tags need not be limited to the use of the "<" and the ">" characters as brackets, nor are brackets even necessarily mandated.

Tags can also be used to cause specific tasks, or instructions, to be carried out by the receiving machine. A kiosk, for example, can receive a document that contains updates to the kiosk's display along with instructions to "send back" a tally of how much traffic has been encountered. As another example, instructions can be issued via tags to point-of-sale displays, such as gasoline pumps, to request sales information or to update various information displayed. Using the IMS module described above, these tasks could be automated according to a schedule.

Device Control and Polling

According to another aspect of the present invention, an e-mail message may be used to deliver machine and/or device control instructions across a computer network to a device or machine in communication therewith. The machine and/or device control instructions may be formatted in various protocols including, but not limited to, "ladder logic" and various other industrial machine control languages. Exemplary applications include: updating point of sale devices contain informational displays, such as kiosks and gasoline pumps; traffic control devices, such as signals, railway signals; security systems; and other remotely distributed devices and systems.

Instructions are preferably transmitted to a device's incoming e-mail box to await retrieval by the device. A receiving device need not be in continuous communication with the computer network. A receiving device may connect to the network periodically to retrieve instructions from its incoming e-mail box, log off and then carry out the instructions. A receiving device may be instructed to transmit data across the network to another receiving device. For example, information including sales totals, number of users, quantities of product delivered, and the like, may be transmitted.

EXAMPLE 1

Figure 13A:
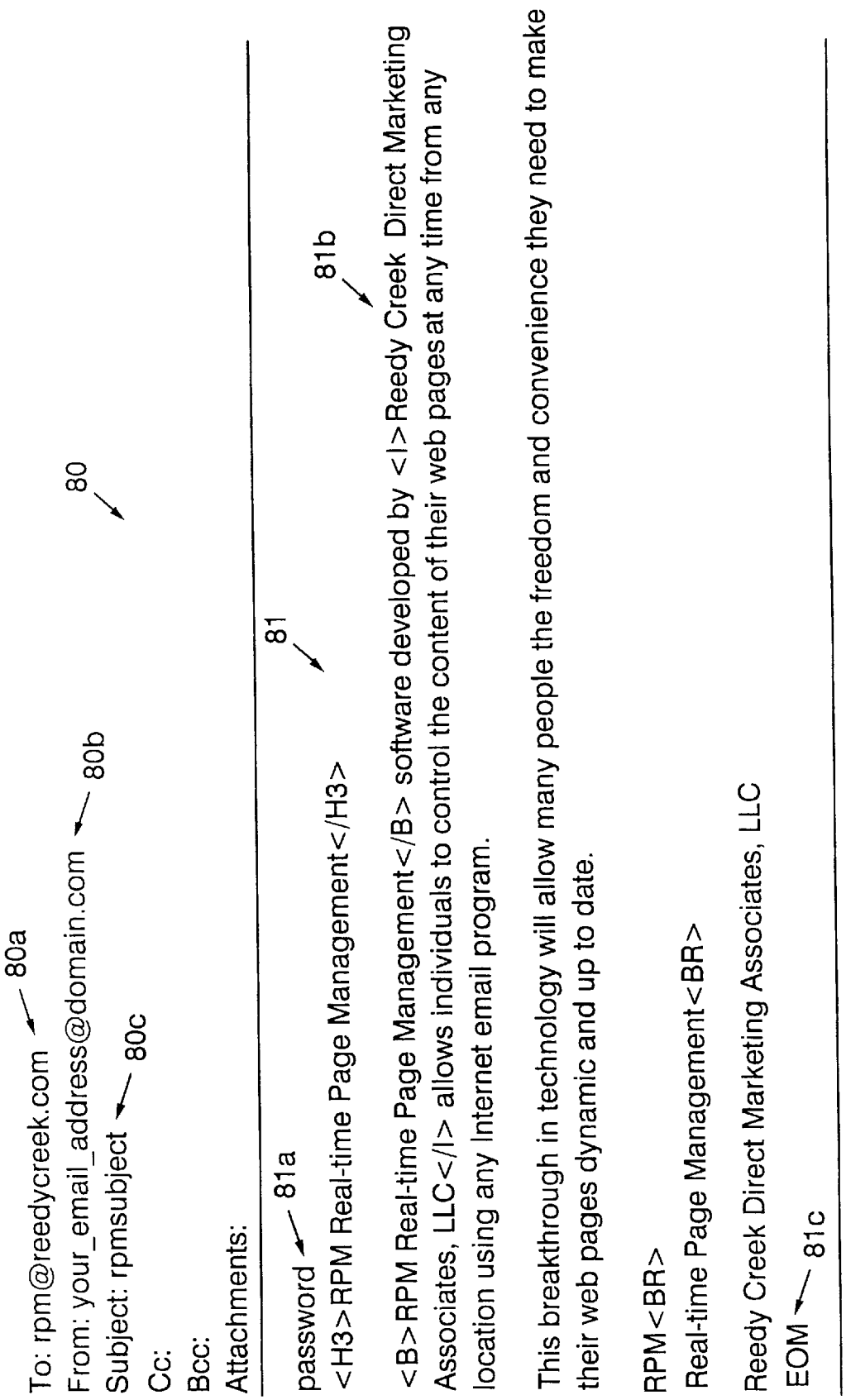

Referring now to FIGS. 13A and 13B, an example of an e-mail message containing Web page content changes according to an embodiment of the present invention is illustrated. In FIG. 13A an e-mail message 80 is configured to transmit content changes to a Web page. The address "rpm@reedycreek.com" in the "To" field 80a identifies the e-mail address of the Web server that will process the content changes for the targeted Web page. The address "your_email_address@domain.com" in the "From" field 80b is the e-mail address from which the content changes are sent. As described above, the sender's e-mail address is used for authentication purposes. The information "rpmsubject" in the "Subject" field 80c identifies the entry in the configuration file within which the targeted Web page and the appropriate port are identified that will be provided with the content changes. The body portion 81 of the e-mail message 80 includes a password 81a. As described above, the password is used for authentication purposes and to identify the beginning of the Web page content changes 81b. The end of the Web page content changes 81b is identified by the EOM command 81c.

Referring now to FIG. 13B, the Web page content changes 81b from the e-mail message 80 illustrated in FIG. 13A are displayed as they would be viewed via a browser. A tag within the target Web page identifying the port "rpmsubject" has been replaced with the content changes 81b. As previously discussed, a browser will not display the various HTML tags, but will use the tags to arrange and format the information within the various tags for display, as illustrated 82.

EXAMPLE 2

Figure 14A:
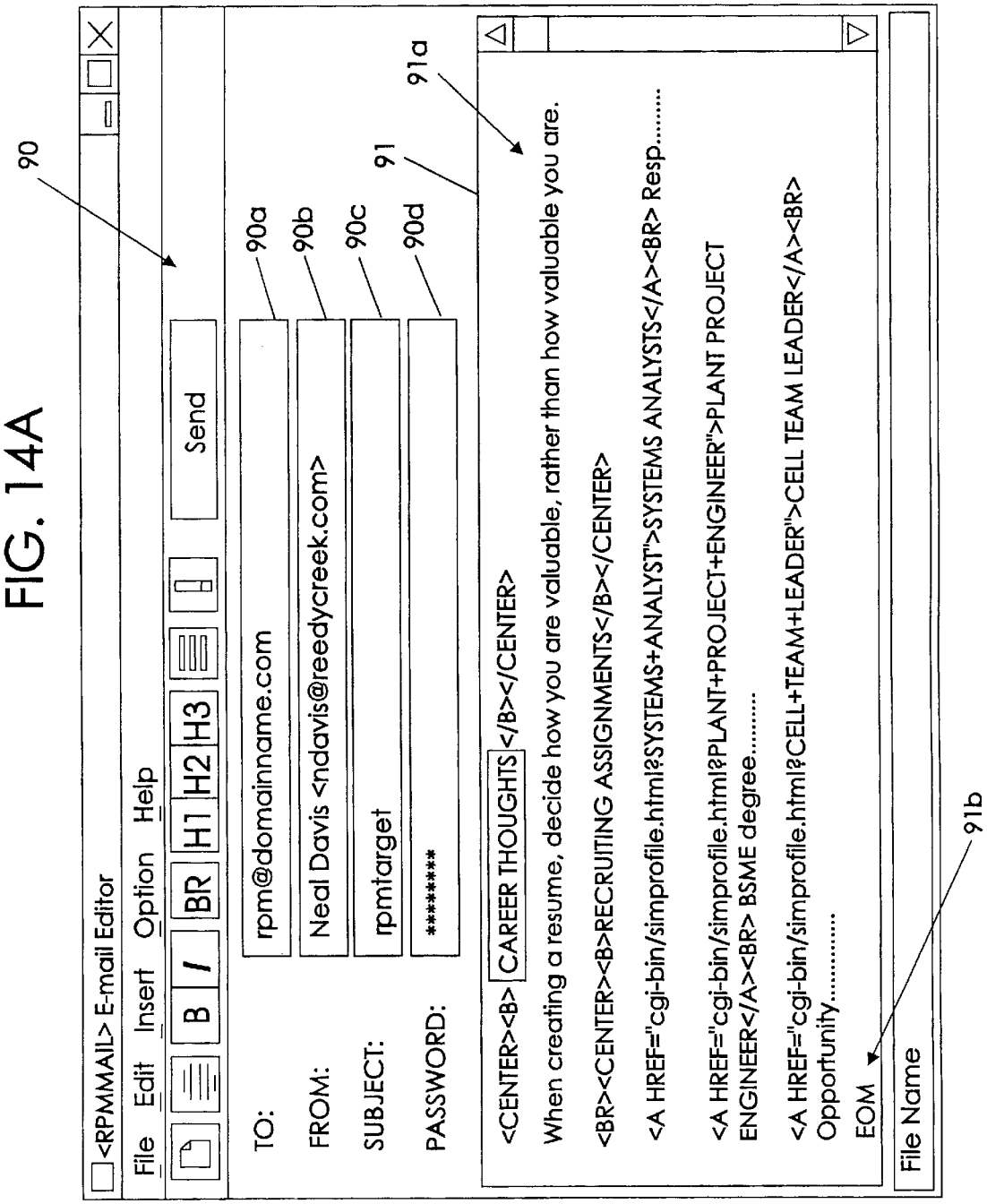
FIG. 14A illustrates an e-mail message configured to transmit content changes to a Web page.

Referring now to FIGS. 14A–14D, another example of operations for updating a Web page according to an embodiment of the present invention is illustrated. In FIG. 14A an e-mail message 90 is configured to transmit content changes to a Web page. The address "rpm@domainname.com" in the "To" field 90a identifies the e-mail address of the Web server that will process the content changes for the targeted Web page. The address "ndavis@reedycreek.com" in the "From" field 90b is the e-mail address from which the content changes are sent. As described above, the sender's e-mail address is used for authentication purposes. The information "rpmtarget" in the "Subject" field 90c identifies the entry in the configuration file within which the targeted page and the appropriate port are identified that will be provided with the content changes. A password is provided within the "Password" field 90d. As described above, the password is used for authentication purposes and to identify the beginning of the Web page content changes 91a within the body portion 91 of the e-mail message 90. The end of the Web page content changes 91a is identified by the EOM command 91b.

Referring now to FIG. 14B, the target Web page HTML source file 92 is illustrated. Within the body portion 93 of the HTML source file 92 is a port identified by the <RPM> markup tag 94. The <RPM> markup tag 94 is positioned within the HTML source file 92 at the location where incoming Web page content changes are to be positioned.

Figures 1, 14D:
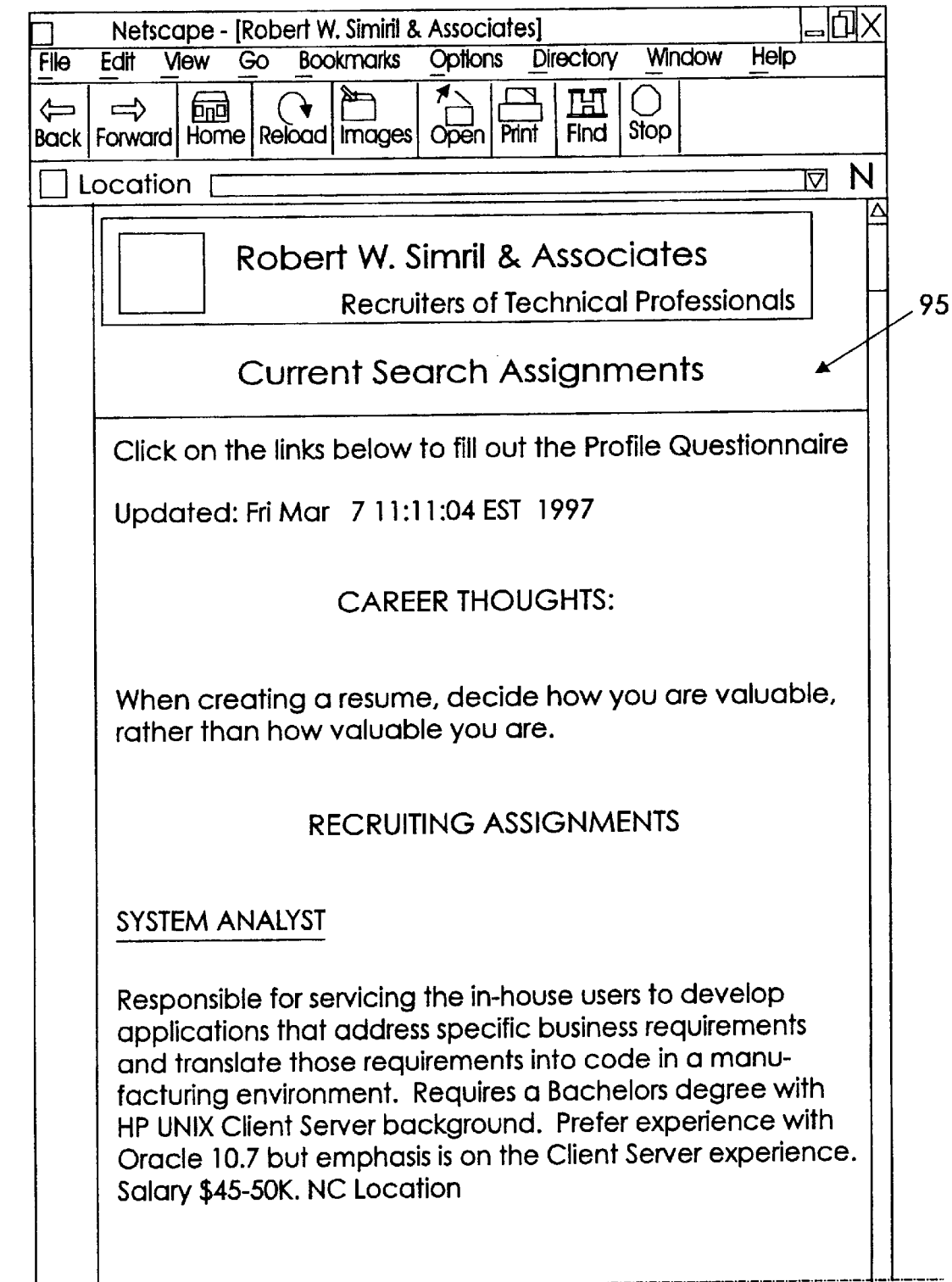
FIG. 14D includes two parts, FIGS. 14D1 and 14D2, and illustrates the revised Web page of FIG. 14C as viewed by a browser on a client.

Referring now to FIG. 14C, the <RPM> markup tag 94 has been replaced with the content changes 91a provided within the e-mail message 90 (FIG. 14A). Subsequently, the HTML source file 92 is saved to a predetermined browser-accessible directory in accordance with instructions within the configuration file affiliated therewith. FIG. 14D illustrates the saved file 95 as viewed by a browser on a client.

Software Environment

The present invention is preferably implemented as a stand-alone software module that is loaded on a host Web server along with existing Web server software. The Web server module is compatible with all Web server software including, but not limited to, Apache, CERN HTTPD, NCSA HTTPD, Netscape, Microsoft NT, Quarterdeck and Spry. No modification to existing Web server software is required for the Web server module to recognize incoming e-mail messages configured as described above and process the Web page content changes included therewithin. By contrast, in order to add SSI capability to a Web server, the entire Web server software package is typically replaced by an SSI version. Conventional e-mail utilities may be used to transmit specially configured e-mail messages to the Web server. In a preferred embodiment, a specially configured e-mail editor, as described above, is utilized to configure and transmit Web page content changes via Internet e-mail.

The present invention may be bundled with a word processing program or other application programs including, but not limited to, spreadsheets and databases. Web page content can be created or modified within a program such as Microsoft Word® and then transmitted as an e-mail message configured as described above to a Web server. In addition, the client side software module of the present invention can be utilized to strip tags from existing HTML files and convert portions thereof to an e-mail message configured as described above.

The present invention may be written in various computer languages including, but not limited to, C, C++, Smalltalk, Java, and other conventional programming languages such as BASIC, FORTRAN and COBOL. The present invention may run on current standard desktop computer platforms including, but not limited to, Windows®, Windows 95®, Windows NT®, UNIX®, and OS/2®. The present invention utilizes, in part, many standard features of current desktop configurations, such as the ability to store data locally, connect to the Internet, and display visual information.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method of revising a static hypertext document stored within a server in communication with a computer network, said static hypertext document having at least one designated area therewithin configured to receive content revisions from a user, wherein each designated area is identified by a respective markup tag that is not visible when the static hypertext document is displayed via a browser, said method comprising the steps of:

generating an e-mail message containing a content revision for a designated area of said static hypertext document, wherein said e-mail message identifies said static hypertext document and a respective markup tag for said designated area of said static hypertext document;

transmitting said e-mail message to said server via said computer network;

authenticating said e-mail message received by said server;

replacing said identified markup tag within said designated area of said static hypertext document with said content revision contained within said authenticated e-mail message, wherein said content revision is visible when said static hypertext document is displayed via a browser; and storing said revised static hypertext document in a directory on said server.

2. A method according to claim 1 further comprising the step of acknowledging to the sender of said e-mail message that said content revision has been successfully added to said designated area of said static hypertext document.

3. A method according to claim 1 wherein said authenticating step comprises the steps of:

locating a configuration file associated with said static hypertext document; and comparing information within said e-mail message with information within said configuration file to determine whether said content revision is authorized.

4. A method according to claim 3 wherein a password in said e-mail message is compared with a password in said configuration file.

5. A method according to claim 1 wherein said step of generating an e-mail message includes attaching a binary file to said e-mail message.

6. A method according to claim 5 further comprising the step of storing a binary file attached to said e-mail message in a directory on said server.

7. A method according to claim 1 wherein said content revision to said static hypertext document is independently created external to said e-mail message.

8. A data processing system for revising a static hypertext document stored within a server in communication with a computer network, said static hypertext document having at least one designated area therewithin configured to receive content revisions from a user, wherein each designated area is identified by a respective markup tag that is not visible when the static hypertext document is displayed via a browser, said system comprising:

means for generating an e-mail message containing a content revision for a designated area of said static hypertext document, wherein said e-mail message identifies said static hypertext document and a respective markup tag for said designated area of said static hypertext document;

means for transmitting said e-mail message to said server via said computer network;

means responsive to said transmitting means for authenticating said e-mail message received by said server;

means responsive to said authenticating means for replacing said identified markup tag within said designated area of said static hypertext document with said content revision contained within said authenticated e-mail message, wherein said content revision is visible when said static hypertext document is displayed via a browser; and means responsive to said replacing means for storing said revised static hypertext document in a directory on said server.

9. A data processing system according to claim 8 further comprising means responsive to said replacing means for acknowledging to the sender of said e-mail message that said content revision has been successfully added to said designated area of said static hypertext document.

10. A data processing system according to claim 8 wherein said authenticating means comprises:
means for locating a configuration file associated with said static hypertext document; and
means responsive to said locating means for comparing information within said e-mail message with information within said configuration file to determine whether said content revision is authorized.

11. A data processing system according to claim 10 wherein said comparing means comprises means for comparing a password in said e-mail message with a password in said configuration file.

12. A data processing system according to claim 8 wherein said means for generating an e-mail message includes means for attaching a binary file to said e-mail message.

13. A data processing system according to claim 12 further comprising means for storing a binary file attached to said e-mail message in a directory on said server.

14. A data processing system according to claim 8 further comprising means for creating said static hypertext document content revision independently of and external to said e-mail message.

15. A computer program product for use with a data processing system for revising a static hypertext document stored within a server in communication with a computer network, said static hypertext document having at least one designated area therewithin configured to receive content revisions from a user, wherein each designated area is identified by a respective markup tag that is not visible when the static hypertext document is displayed via a browser, said computer program product comprising:
a computer usable medium having computer readable program code means embodied in said medium for generating an e-mail message containing a content revision for a designated area of said static hypertext document, wherein said e-mail message identifies said static hypertext document and a respective markup tag for said designated area of said static hypertext document;
the computer usable medium having computer readable program code means embodied in said medium for transmitting said e-mail message to said server via said computer network;
the computer usable medium having computer readable program code means embodied in said medium responsive to said transmitting means for authenticating said e-mail message received by said server;
the computer usable medium having computer readable program code means embodied in said medium responsive to said authenticating means for replacing said identified markup tag within said designated area of said static hypertext document with said content revision contained within said authenticated e-mail message, wherein said content revision is visible when said static hypertext document is displayed via a browser; and
the computer usable medium having computer readable program code means embodied in said medium responsive to said replacing means for storing said revised static hypertext document in a directory on said server.

16. A computer program product according to claim 15, further comprising computer readable program code means responsive to said replacing means for acknowledging to the sender of said e-mail message that said content revision has been successfully added to said designated area of said static hypertext document.

17. A computer program product according to claim 15 wherein said computer readable program code means for authenticating said e-mail message received by said server comprises:
computer readable program code means, embodied in said media, for locating a configuration file associated with said static hypertext document; and
computer readable program code means, embodied in said media, responsive to said locating means for comparing information within said e-mail message with information within said configuration file to determine whether said content revision is authorized.

18. A computer program product according to claim 17 wherein said computer readable program code means for comparing information within said e-mail message with information within said configuration file comprises computer readable program code means, embodied in said media, for comparing a password in said e-mail message with a password in said configuration file.

19. A computer program product according to claim 15 wherein said computer readable program code means for generating an e-mail message means for generating an e-mail message comprises computer readable program code means, embodied in said media, for attaching a binary file to said e-mail message.

20. A computer program product according to claim 19 further comprising computer readable program code means, embodied in said media, for storing a binary file attached to said e-mail message in a directory on said server.

21. A computer program product according to claim 15 further comprising computer readable program code means, embodied in said media, for creating said static hypertext document content revision independently of and external to said e-mail message.

22. A method of revising a static Web page stored within a server in communication with an Internet network, said static Web page having at least one designated area therewithin configured to receive content revisions from a user, wherein each designated area is identified by a respective markup tag that is not visible when the static Web page is displayed via a browser, said method comprising the steps of:
generating an e-mail message containing a content revision for a designated area of said static Web page, wherein said e-mail message identifies said static Web page and a respective markup tag for said designated area of said static Web page;
transmitting said e-mail message to said server via said Internet network;
authenticating said e-mail message received by said server;
replacing said identified markup tag within said designated area of said static Web page with said content revision contained within said authenticated e-mail message, wherein said content revision is visible when said static Web page is displayed via a browser; and
storing said revised static Web page in a directory on said server.

23. A method according to claim 22 further comprising the step of acknowledging to the sender of said e-mail message that said content revision has been successfully added to said designated area of said static Web page.

24. A method according to claim 22 wherein said authenticating step comprises the steps of:
   locating a configuration file associated with said static Web page; and
   comparing information within said e-mail message with information within said configuration file to determine whether said content revision is authorized.

25. A method according to claim 24 wherein a password in said e-mail message is compared with a password in said configuration file.

26. A method according to claim 22 wherein said step of generating an e-mail message includes attaching a binary file to said e-mail message.

27. A method according to claim 26 further comprising the step of storing a binary file attached to said e-mail message in a directory on said server.

28. A method according to claim 22 wherein said content revision to said static Web page is independently created external to said e-mail message.

29. A data processing system for revising a static Web page stored within a server in communication with an Internet network, said static Web page having at least one designated area therewithin configured to receive content revisions from a user, wherein each designated area is identified by a respective markup tag that is not visible when the static Web page is displayed via a browser, said system comprising:
   means for generating an e-mail message containing a content revision for a designated area of said static Web page, wherein said e-mail message identifies said static Web page and a respective markup tag for said designated area of said static Web page;
   means for transmitting said e-mail message to said server via said Internet network;
   means responsive to said transmitting means for authenticating said e-mail message received by said server;
   means responsive to said authenticating means for replacing said identified markup tag within said designated area of said static Web page with said content revision contained within said authenticated e-mail message, wherein said content revision is visible when said static Web page is displayed via a browser; and
   means responsive to said replacing means for storing said revised static Web page in a directory on said server.

30. A data processing system according to claim 29 further comprising means responsive to said replacing means for acknowledging to the sender of said e-mail message that said content revision has been successfully added to said designated area of said static Web page.

31. A data processing system according to claim 29 wherein said authenticating means comprises:
   means for locating a configuration file associated with said static Web page; and
   means responsive to said locating means for comparing information within said e-mail message-with information within said configuration file to determine whether said content revision is authorized.

32. A data processing system according to claim 31 wherein said comparing means comprises means for comparing a password in said e-mail message with a password in said configuration file.

33. A data processing system according to claim 29 wherein said means for generating an e-mail message includes means for attaching a binary file to said e-mail message.

34. A data processing system according to claim 33 further comprising means for storing a binary file attached to said e-mail message in a directory on said server.

35. A data processing system according to claim 29 further comprising means for creating said static Web page content revision independently of and external to said e-mail message.

36. A computer program product for use with a data processing system for revising a static Web page stored within a server in communication with an Internet network, said static Web page having at least one designated area therewithin configured to receive content revisions from a user, wherein each designated area is identified by a respective markup tag that is not visible when the static Web page is displayed via a browser, said computer program product comprising:
   a computer usable medium having computer readable program code means embodied in said medium for generating an e-mail message containing a content revision for a designated area of said static Web page, wherein said e-mail message identifies said static Web page and a respective markup tag for said designated area of said static Web page;
   the computer usable medium having computer readable program code means embodied in said medium for transmitting said e-mail message to said server via said Internet network;
   the computer usable medium having computer readable program code means embodied in said medium responsive to said transmitting means for authenticating said e-mail message received by said server;
   the computer usable medium having computer readable program code means embodied in said medium responsive to said authenticating means for replacing said identified markup tag within said designated area of said static Web page with said content revision contained within said authenticated e-mail message, wherein said content revision is visible when said static Web page is displayed via a browser; and
   the computer usable medium having computer readable program code means embodied in said medium responsive to said replacing means for storing said revised static Web page in a directory on said server.

37. A computer program product according to claim 36, further comprising computer readable program code means responsive to said replacing means for acknowledging to the sender of said e-mail message that said content revision has been successfully added to said designated area of said static Web page.

38. A computer program product according to claim 36 wherein said computer readable program code means for authenticating said e-mail message received by said server comprises:
   computer readable program code means, embodied in said media, for locating a configuration file associated with said static Web page; and
   computer readable program code means, embodied in said media, responsive to said locating means for comparing information within said e-mail message with information within said configuration file to determine whether said content revision is authorized.

39. A computer program product according to claim 38 wherein said computer readable program code means for comparing information within said e-mail message with information within said configuration file comprises computer readable program code means, embodied in said media, for comparing a password in said e-mail message with a password in said configuration file.

40. A computer program product according to claim 36 wherein said computer readable program code means for generating an e-mail message means for generating an e-mail message comprises computer readable program code means, embodied in said media, for attaching a binary file to said e-mail message.

41. A computer program product according to claim 40 further comprising computer readable program code means, embodied in said media, for storing a binary file attached to said e-mail message in a directory on said server.

42. A computer program product according to claim 36 further comprising computer readable program code means, embodied in said media, for creating said static Web page content revision independently of and external to said e-mail message.

43. A method of transmitting instructions to a device in communication with a computer network, said method comprising the steps of:

generating an e-mail message containing at least one instruction executable by said device;

transmitting said e-mail message to said device via said computer network;

authenticating said e-mail message received by said device; and retrieving said at least one instruction from said authenticated e-mail message.

44. A method according to claim 43 further comprising the step of acknowledging to a sender of said e-mail message that said at least one instruction has been received by said device.

45. A method according to claim 43 wherein said authenticating step comprises the steps of:

locating a configuration file associated with said at least one instruction; and comparing information within said e-mail message with information within said configuration file to determine whether said at least one instruction is authorized.

* * * * *